US012650342B2

(12) United States Patent
Tokuda et al.

(10) Patent No.: US 12,650,342 B2
(45) Date of Patent: Jun. 9, 2026

(54) COLORIMETRY DEVICE

(71) Applicant: SEIKO EPSON CORPORATION, Tokyo (JP)

(72) Inventors: Takeshi Tokuda, Shiojiri (JP); Katsumi Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 87 days.

(21) Appl. No.: 18/661,855

(22) Filed: May 13, 2024

(65) Prior Publication Data

US 2024/0385044 A1 Nov. 21, 2024

(30) Foreign Application Priority Data

May 15, 2023 (JP) .................................. 2023-080123

(51) Int. Cl.
*G01J 3/52* (2006.01)
*G01J 3/02* (2006.01)

(52) U.S. Cl.
CPC .............. *G01J 3/52* (2013.01); *G01J 3/0202* (2013.01); *G01J 3/0291* (2013.01)

(58) Field of Classification Search
CPC .............. G01J 2003/061; G01J 3/0202; G01J 3/0267; G01J 3/027; G01J 3/0289; G01J 3/06; G01J 3/50; G01J 3/524; H04N 1/6044
See application file for complete search history.

(56) References Cited

U.S. PATENT DOCUMENTS

| | | | |
|---|---|---|---|
| 2008/0252948 A1 | 10/2008 | Onishi | |
| 2020/0070539 A1* | 3/2020 | Kobayashi | ............. B41J 2/2103 |

FOREIGN PATENT DOCUMENTS

| | | | |
|---|---|---|---|
| JP | 2008-281549 A | 11/2008 | |
| JP | 2013-111750 A | 6/2013 | |
| JP | 2014-179811 A | 9/2014 | |
| JP | 2016-212001 A | 12/2016 | |
| WO | WO-2016181721 A1 * | 11/2016 | ............... G01J 3/50 |

* cited by examiner

*Primary Examiner* — Hina F Ayub
(74) *Attorney, Agent, or Firm* — WORKMAN NYDEGGER

(57) ABSTRACT

A colorimetry device includes a support base having a support surface for supporting a measurement target and a carriage to which a colorimeter is detachably attached and that is configured to move in a first direction, which is a direction along the support surface, and in a second direction, which is a direction along the support surface and which intersects the first direction, the colorimeter being configured to measure color of the measurement target, wherein the carriage includes, on an inner wall of an accommodation section that accommodates the colorimeter, a contact surface that is in contact with a side surface of the colorimeter when the colorimeter is attached or detached and a friction coefficient μ1 between the contact surface and the side surface of the colorimeter is smaller than a friction coefficient μ2 between the housing of the carriage and the side surface of the colorimeter.

19 Claims, 18 Drawing Sheets

COLORIMETRY DEVICE

The present application is based on, and claims priority from JP Application Serial Number 2023-080123, filed May 15, 2023, the disclosure of which is hereby incorporated by reference herein in its entirety.

BACKGROUND

1. Technical Field

The present disclosure relates to a colorimetry device equipped with a carriage to which a colorimeter is detachably attached, the colorimeter being configured to measure color of a measurement target.

2. Related Art

JP-A-2008-281549 discloses a colorimetry device that includes a colorimetry device holder for holding a colorimeter and a colorimeter carriage for reciprocally moving the colorimetry device holder in a predetermined direction of a colorimetry pattern. The colorimeter is provided so as to be attached to and detached from the colorimeter carriage.

In a configuration in which the colorimeter is attached to and detached from the colorimeter carriage, friction between the colorimeter and the colorimeter carriage increases resistance when the colorimeter is being attached to and detached from the colorimeter carriage, and an excessive load is applied to the colorimeter carriage when the colorimeter is being attached to and detached from the colorimeter carriage, which may damage the colorimeter carriage and affect the colorimetry accuracy.

SUMMARY

The colorimetry device of the present disclosure for solving the above problem includes a support base having a support surface for supporting a measurement target and a carriage to which a colorimeter, which is configured to measure color of the measurement target, is detachably attached and that is configured to move in a first direction, which is a direction along the support surface, and in a second direction, which is a direction along the support surface and which intersects the first direction, wherein the carriage includes, on an inner wall of an accommodation section that accommodates the colorimeter, a contact surface that is in contact with a side surface of the colorimeter when the colorimeter is being attached or is being detached and a friction coefficient $\mu 1$ between the contact surface and the side surface of the colorimeter is smaller than a friction coefficient $\mu 2$ between a housing of the carriage and the side surface of the colorimeter.

DESCRIPTION OF EMBODIMENTS

Figure 1:
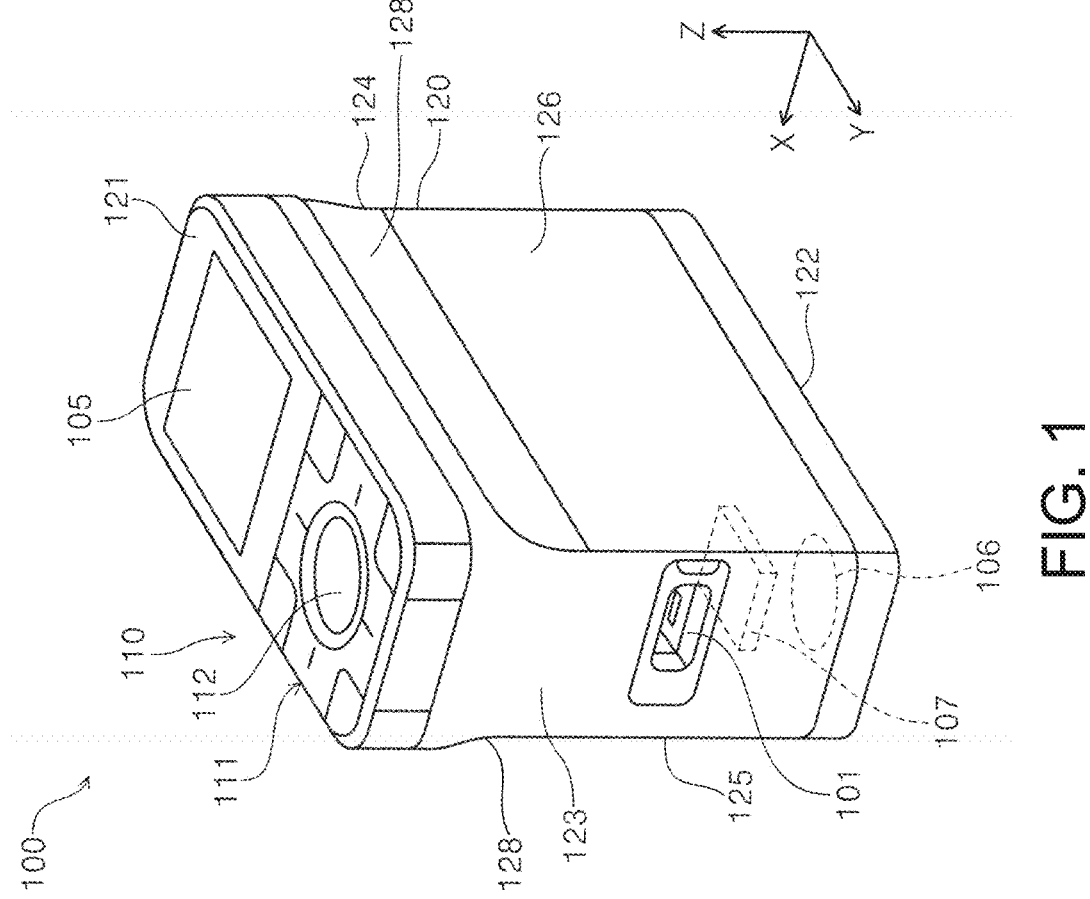
FIG. 1 is a perspective view of a colorimeter.

The present disclosure will be schematically described.

A colorimetry device according to the first aspect includes a support base having a support surface for supporting a measurement target and a carriage to which a colorimeter, which is configured to measure color of the measurement target, is detachably attached and that is configured to move in a first direction, which is a direction along the support surface, and in a second direction, which is a direction along the support surface and which intersects the first direction, wherein the carriage includes, on an inner wall of an accommodation section that accommodates the colorimeter, a contact surface that is in contact with a side surface of the colorimeter when the colorimeter is being attached or is being detached and a friction coefficient $\mu 1$ between the contact surface and the side surface of the colorimeter is smaller than a friction coefficient $\mu 2$ between a housing of the carriage and the side surface of the colorimeter.

According to the present aspect, since the friction coefficient $\mu 1$ between the contact surface and the side surface of the colorimeter is smaller than the friction coefficient $\mu 2$ between the housing of the carriage and the side surface of the colorimeter, it is possible to reduce the frictional resistance when the colorimeter is being attached to and detached from the carriage. As a result, it is possible to prevent the carriage from being damaged due to an excessive load applied to the carriage when the colorimeter is attached or detached.

A second aspect is an aspect dependent on the first aspect, wherein in a state where the support surface is along a horizontal plane, the inner wall of the accommodation section is along a vertical direction, the inner wall further includes a first wall surface, a second wall surface opposed to the first wall surface, a third wall surface that intersects the first wall surface and the second wall surface, and a fourth wall surface opposed to the third wall surface, and the contact surface is provided on at least one of the first wall surface, the second wall surface, the third wall surface, and the fourth wall surface.

According to the present aspect, since the contact surface is provided on at least one of the first wall surface, the second wall surface, the third wall surface, and the fourth wall surface, it is possible to effectively reduce the frictional resistance when the colorimeter is attached to and detached from the carriage.

A third aspect is an aspect dependent on the second aspect, wherein the contact surface extends in a vertical direction and is disposed spaced a gap therebetween along a horizontal direction.

According to the present aspect, since the contact surface extends in the vertical direction and is disposed spaced by the gap opened along the horizontal direction, it is possible to reduce the contact area between the inner wall and the side surface of the colorimeter compared to a configuration in which the contact surfaces are provided over the entire region of the inner wall, and it is possible to effectively reduce the frictional resistance when the colorimeter is attached to and detached from the carriage.

Note that the present aspect is not limited to the second aspect, and may be dependent to the first aspect.

The fourth aspect is an aspect dependent on the third aspect, wherein among the side surfaces of the colorimeter, at least a first side surface and a second side surface opposite to the first side surface have an overhang portion that overhangs laterally and the accommodation section is provided, on the upper portion of the inner wall, with a support section for supporting the colorimeter by catching the overhang portion.

According to the present aspect, since among the side surfaces of the colorimeter, at least the first side surface and the second side surface opposite to the first side surface have the overhang portion that overhangs laterally, it is easy to hold the colorimeter, and the handleability of the colorimeter is improved.

Since the accommodation section of the carriage is provided, on the upper portion of the inner wall, with the support section for supporting the colorimeter by being caught by the overhang portion, the relative position between the carriage and the colorimeter in the attaching/detaching direction of the colorimeter is easily determined, it is possible to suppress the variation of the relative position.

Note that the present aspect is not limited to the third aspect, and may be dependent on the first or second aspect.

The fifth aspect is an aspect dependent on the fourth aspect, wherein the contact surface extends to the support section and contacts the overhang portion.

In a state where the support section supports the overhang portion, the support section and the overhang portion are in intimate contact, easily stuck to each other, there is a possibility that a load is applied to the carriage when removing the colorimeter from the carriage.

However, according to the present aspect, since the contact surface extends to the support section and in contact with the overhang portion, it is possible to suppress the intimate contact between the support section and the overhang portion, and it is possible to suppress the load is applied to the carriage when removing the colorimeter from the carriage.

A sixth aspect is an aspect dependent on the first aspect, wherein an upper end portion of the contact surface extends in a direction away from the side surface of the colorimeter.

According to the present aspect, since the upper end portion of the contact surface extends in the direction away from the side surface of the colorimeter, it is possible to prevent the colorimeter from being caught by the upper end portion of the contact surface when the colorimeter is accommodated in the carriage.

Note that the present aspect is not limited to the first aspect, and may be dependent on any of the second to fifth aspects.

A seventh aspect is an aspect dependent on the first aspect, wherein a lower end portion of the contact surface extends in a direction away from the side surface of the colorimeter.

According to the present aspect, since the lower end portion of the contact surface extends in the direction away from the side surface of the colorimeter, it is possible to prevent the colorimeter from being caught by the lower end portion of the contact surface when the colorimeter is removed from the carriage.

Note that the present aspect is not limited to the first aspect and may be dependent on any one of the second to sixth aspects.

The eighth aspect is an aspect dependent on the fourth aspect, wherein the carriage is provided on a second direction moving section, which is configured to move in the second direction with respect to the support base by the power of a first motor, the carriage is further provided to be movable in the first direction with respect to the second direction moving section by the power of a second motor, and the carriage is further provided to be movable, with respect to the second direction moving section by the power of a third motor, in a third direction, which intersects the first direction and the second direction.

According to the present aspect, since the carriage is movable in the three axial directions by the first motor, the second motor, and the third motor, the degree of freedom of the positioning control of the carriage is improved.

The ninth aspect is an aspect dependent on the eighth aspect, further includes a control section configured to control the first motor, the second motor, and the third motor, wherein in a state where the support section supports the colorimeter, the colorimeter protrudes from a bottom surface of the carriage with respect to the support base, when the colorimeter is to perform colorimetry of the measurement target, the control section performs a lowering control of lowering the carriage to a position at which a bottom surface of the colorimeter is in contact with the measurement target and then of further lowering the carriage in a range in which the bottom surface of the carriage is not in contact with the measurement target, and when the lowering control is being performed, the contact surface and the side surface of the colorimeter rub against each other.

According to the present aspect, when the colorimeter performs colorimetry of the measurement target, the control section performs the lowering control of lowering the carriage to the position at which the bottom surface of the colorimeter is in contact with the measurement target and then further lowering the carriage in the range in which the bottom surface of the carriage is not in contact with the measurement target, it is possible to suppress the variation of the relative position between the colorimeter and the measurement target in the normal direction with respect to the support surface and it is possible to obtain an appropriate colorimetry result.

Further, in such a configuration, during the lowering control, the contact surface and the side surface of the colorimeter rub against each other, the colorimeter is pressed against the measurement target by friction between the contact surface and the side surface of the colorimeter. However, since the friction coefficient $\mu 1$, which is a friction coefficient between the contact surface and the side surface of the colorimeter, is suppressed, it is possible to suppress the colorimeter from being strongly pressed against the measurement target, and to suppress the colorimeter from damaging the measurement target.

The tenth aspect is an aspect dependent on any of the first to ninth aspects, wherein the contact surface is formed of a sheet material attached to the inner wall of the accommodation section.

According to the present aspect, since the contact surface is formed of the sheet material attached to the inner wall of the accommodation section, it is possible to easily adjust the friction coefficient μ1.

The eleventh aspect is an aspect dependent on any of the first to ninth aspects, wherein the carriage includes an outer housing forming an outer shell of the carriage and a case that is accommodated in the outer housing and that forms the accommodation section, and the contact surface is formed integrally with the case.

According to the present aspect, since the carriage includes the outer housing forming the outer shell of the carriage and the case that is accommodated in the outer housing and that forms the accommodation section, and the contact surface is formed integrally with the case, it is possible to easily obtain the contact surface.

A colorimetry device according to the twelfth aspect includes a support base having a support surface for supporting a measurement target and a carriage to which a colorimeter, which is configured to measure color of the measurement target, is detachably attached and that is configured to move in a first direction, which is a direction along the support surface, and in a second direction, which is a direction along the support surface and which intersects the first direction, wherein the carriage includes, on an inner wall of an accommodation section that accommodates the colorimeter, a contact surface that is in contact with a side surface of the colorimeter when the colorimeter is attached or detached, a friction coefficient μ1 between the contact surface and the side surface of the colorimeter is smaller than a friction coefficient μ2 between a housing of the carriage and the side surface of the colorimeter, the accommodation section includes a support section that supports the colorimeter, the carriage is provided on a second direction moving section, which is configured to move in the second direction with respect to the support base by the power of a first motor, the carriage is further provided to be movable in the first direction with respect to the second direction moving section by the power of a second motor, the carriage is further provided to be movable, with respect to the second direction moving section by the power of a third motor, in a third direction, which intersects the first direction and the second direction, a control section configured to control the first motor, the second motor, and the third motor, in a state where the support section supports the colorimeter, the colorimeter protrudes from a bottom surface of the carriage with respect to the support base, when the colorimeter is to perform colorimetry of the measurement target, the control section performs a lowering control of lowering the carriage to a position at which a bottom surface of the colorimeter is in contact with the measurement target and then of further lowering the carriage in a range in which the bottom surface of the carriage is not in contact with the measurement target, and when the lowering control is being performed, the contact surface and the side surface of the colorimeter rub against each other.

According to the present aspect, when the colorimeter performs colorimetry of the measurement target, the control section performs the lowering control of lowering the carriage to the position at which the bottom surface of the colorimeter is in contact with the measurement target and then further lowering the carriage in the range in which the bottom surface of the carriage is not in contact with the measurement target, it is possible to suppress the variation of the relative position between the colorimeter and the measurement target in the normal direction with respect to the support surface and it is possible to obtain an appropriate colorimetry result.

Further, in such a configuration, during the lowering control, the contact surface and the side surface of the colorimeter rub against each other, the colorimeter is pressed against the measurement target by friction between the contact surface and the side surface of the colorimeter. However, since the friction coefficient μ1, which is a friction coefficient between the contact surface and the side surface of the colorimeter, is suppressed, it is possible to suppress the colorimeter from being strongly pressed against the measurement target, and to suppress the colorimeter from damaging the measurement target.

Hereinafter, the present disclosure will be specifically described.

An X-Y-Z coordinate system shown in each figure is a rectangular coordinate system, in which an X-Y plane is a horizontal plane, and an X-Z plane and a Y-Z plane are vertical planes.

In the present embodiment, in a state where a support surface 10a of a support base 10 is along the horizontal plane, an X-axis direction and a Y-axis direction are directions along the support surface 10a. Hereinafter, when the configuration of a colorimeter 100 and a colorimetry device 1 is described, it is assumed that the support surface 10a of the support base 10 is along the horizontal plane. In this case the Y-axis direction is an example of a first direction, the X-axis direction is an example of a second direction, a Z-axis direction is an example of a third direction. The Z-axis direction is a vertical direction, a +Z direction is a vertically upward direction, and a −Z direction is a vertically downward direction. The +Y direction is the rear of the device, and the −Y direction is the front of the device.

Hereinafter, first, the configuration of the colorimeter 100 for measuring color of a colorimetry target will be outlined with reference to FIG. 1.

The colorimeter 100 according to the present embodiment is a hand-type colorimeter that can be held and handled by a user with one hand. The colorimeter 100 includes an incident light processing section 107 that processes incident light in the device. Although detailed description of the incident light processing section 107 is omitted, the incident light processing section 107 in the present embodiment includes an optical filter (not shown).

This optical filter selectively transmits an arbitrary wavelength component from the light incident on the inside of the device. The light transmitted through the optical filter enters a light receiving element (not shown), specifically, a photodiode. Then the intensity of the incident light is converted into a voltage value and is output to the control section (not shown) of the colorimeter 100. The colorimeter 100 measures the spectrum of the colorimetry target by repeatedly performing wavelength selection by the optical filter and acquisition of the received light intensity. In the present embodiment, the optical filter is a wavelength variable type Fabry-Perot etalon, and is a wavelength filter using multiple interference of two opposing reflection surfaces. Of course, the incident light processing section 107 is not limited to a configuration including such an optical filter. The wavelength variable type Fabry-Perot etalon is configured to select a wavelength by controlling a gap in an optical axis direction between a pair of mirrors (not shown) disposed to face each other with a gap therebetween in the optical axis direction.

Next, the colorimeter 100 has an upper surface 121 as a surface in the +Z direction and a bottom surface 122 as a surface in the −Z direction. The colorimeter 100 has a right side surface 125, which is a surface in the +X direction and is an example of a first side surface, a left side surface 126, which is a surface in the −X direction and is an example of a second side surface, a rear surface 123, which is a surface in the +Y direction and is an example of a third side surface, and a front surface 124, which is a surface in the −Y direction and is an example of a fourth side surface. Reference symbol 120 denotes a housing forming an outer shell of the colorimeter 100.

Hereinafter, the right side surface 125, the left side surface 126, the rear surface 123, and the front surface 124 may be referred to as "side surfaces of the colorimeter 100".

An opening section 106 is formed in the bottom surface 122, and incident light from the colorimetry target toward the incident light processing section 107 is taken into the device through the opening section 106. A light emitting section (not shown) is provided inside the opening section 106, and light emitted from the light emitting section travels toward the outside of the device via the opening section 106 and irradiates the colorimetry target facing the bottom surface 122.

An operation section 110 and a screen section 105 are disposed along the Y-axis direction in the upper surface 121. A cross key 111 is provided in the operation section 110, so as to be parallel to the X-axis direction and the Y-axis direction. Further, a determination button 112 is provided in the operation section 110 at the center of the cross key 111. For example, the user can select various items by pressing the cross key 111 with respect to a plurality of menus displayed on the screen section 105, and can determine the selection or execute colorimetry by pressing the determination button 112.

The rear surface 123 is provided with a terminal 101 to which a cable connector 150 (see FIG. 3) attached to an end portion of a communication cable 151 (see FIG. 3) can be connected.

A control section 80 (see FIG. 5) of the colorimetry device 1 and a control section (not shown) of the colorimeter 100 are connected to each other via the communication cable 151, and the control section 80 of the colorimetry device 1 can perform various kinds of control of the colorimeter 100. For example, the control section 80 of the colorimetry device 1 can cause the colorimeter 100 to execute colorimetry at a predetermined timing, and the control section 80 of the colorimetry device 1 can receive the colorimetry result.

In FIG. 1, the right side surface 125 of the colorimeter 100 has an overhang portion 128, which overhangs in the lateral direction, that is, in the +X direction, at the upper portion thereof. Similarly, the left side surface 126 has an overhang portion 128, which overhangs in the lateral direction, that is, in the −X direction, at the upper portion thereof. In other words, the X-axis direction dimension of the colorimeter 100 is formed so as to increase in the +Z direction. Since the colorimeter 100 is formed in this manner, the holding property is improved. In the present embodiment, the overhang portion 128 is formed in a curved surface shape, but is not limited thereto, and may be formed so as to have angular portions.

The overhang portion 128 is provided in the +Z direction with respect to the center of gravity (not shown) of the colorimeter 100 in the Z-axis direction.

Next, the configuration of the colorimetry device 1 will be described with reference to FIG. 2 and subsequent drawings.

Figure 2:
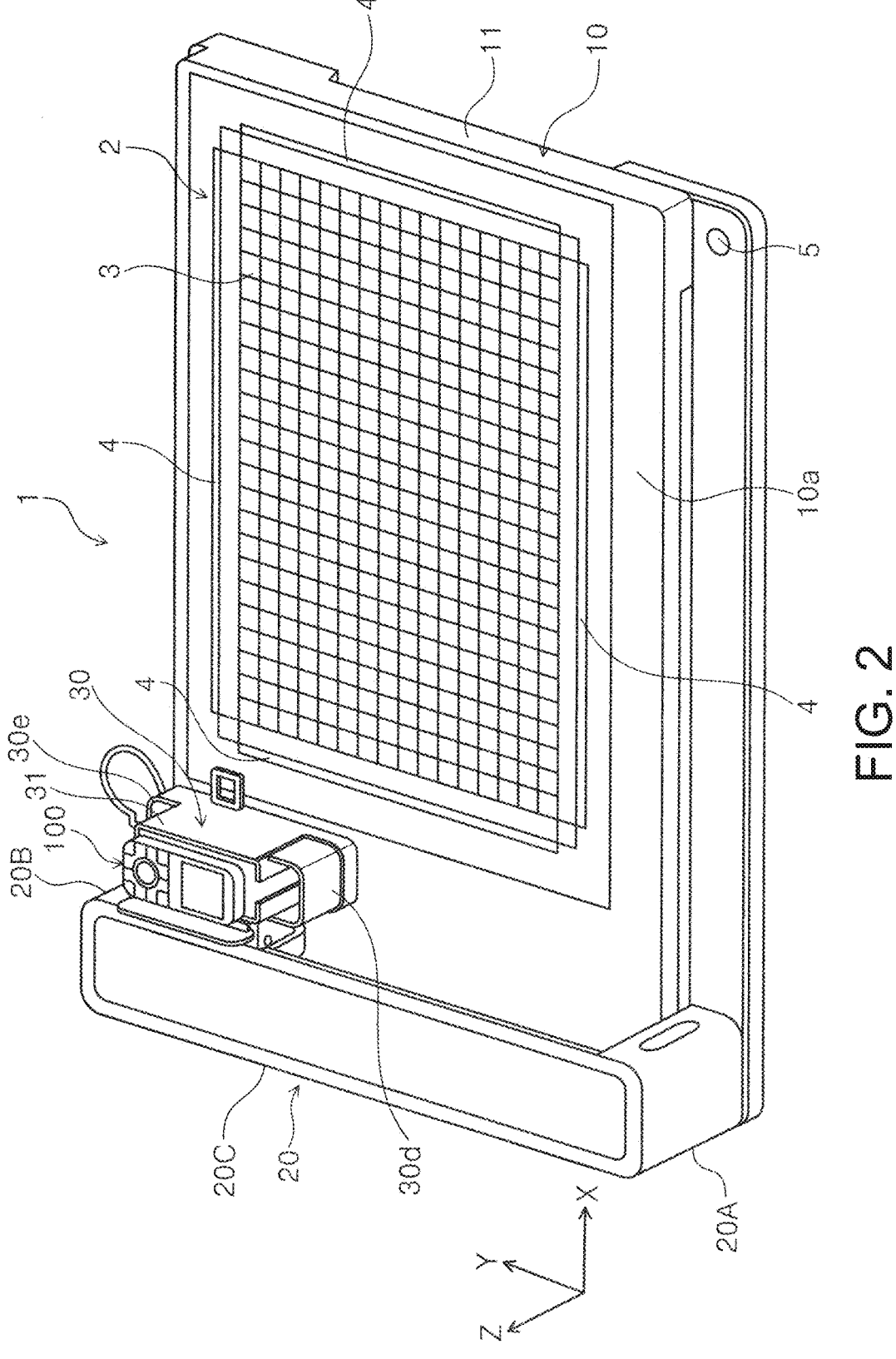
FIG. 2 is a perspective view of a colorimetry device.

The colorimetry device 1 of FIG. 2 is a device in which the colorimeter 100 is mounted on a carriage 30, and the carriage 30, that is, the colorimeter 100, scans a color chart 2 in a state where the color chart 2, which is an example of a measurement target, is supported by the support surface 10a of the support base 10.

As an example, the color chart 2 includes a plurality of color patches 3 disposed in a matrix. Different colors are applied to the plurality of color patches 3.

The support base 10 includes an upper frame 11 forming the support surface 10a, and a lower frame 12 (see FIG. 5) positioned below the upper frame 11. The lower frame constitutes the bottom of the colorimetry device 1.

A portion in the +Y direction and a portion in the −Y direction with respect to the support surface 10a of the support base 10 are configured to be one step lower than the support surface 10a. A power button 5 for turning on and off the power of the device is provided at an end portion in the +X direction at a portion in the −Y direction of the support base 10 configured to be lower by one step.

The colorimetry device 1 includes a gantry 20 that straddles the support surface 10a in the Y-axis direction. The gantry 20 is an example of a second direction moving section that is movable in the X-axis direction, which is the second direction.

The gantry 20 includes a first support section 20A rising in the +Z direction at an end portion of the −Y direction, a second support section 20B rising in the +Z direction at an end portion of the +Y direction, and a beam section 20C extending in the Y-axis direction and supported by the first support section 20A and the second support section 20B.

Figure 5:
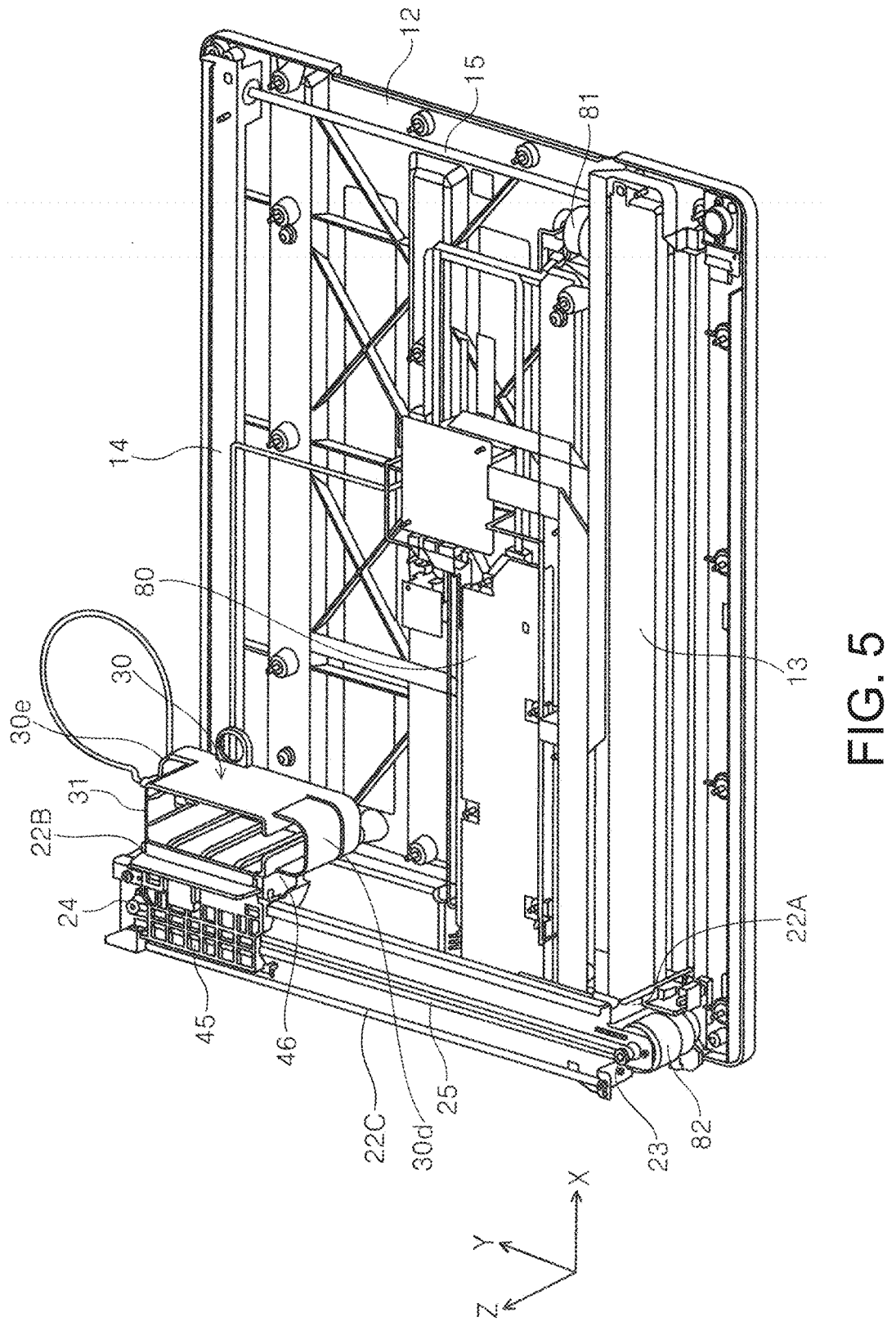
FIG. 5 is a perspective view of the colorimetry device in a state where an upper frame is removed.

In FIG. 5, reference symbol 22A denotes a first frame constituting a base body of the first support section 20A, reference symbol 22B denotes a second frame constituting a base body of the second support section 20B, and reference symbol 22C denotes a beam section frame constituting a base body of the beam section 20C.

Figure 6:
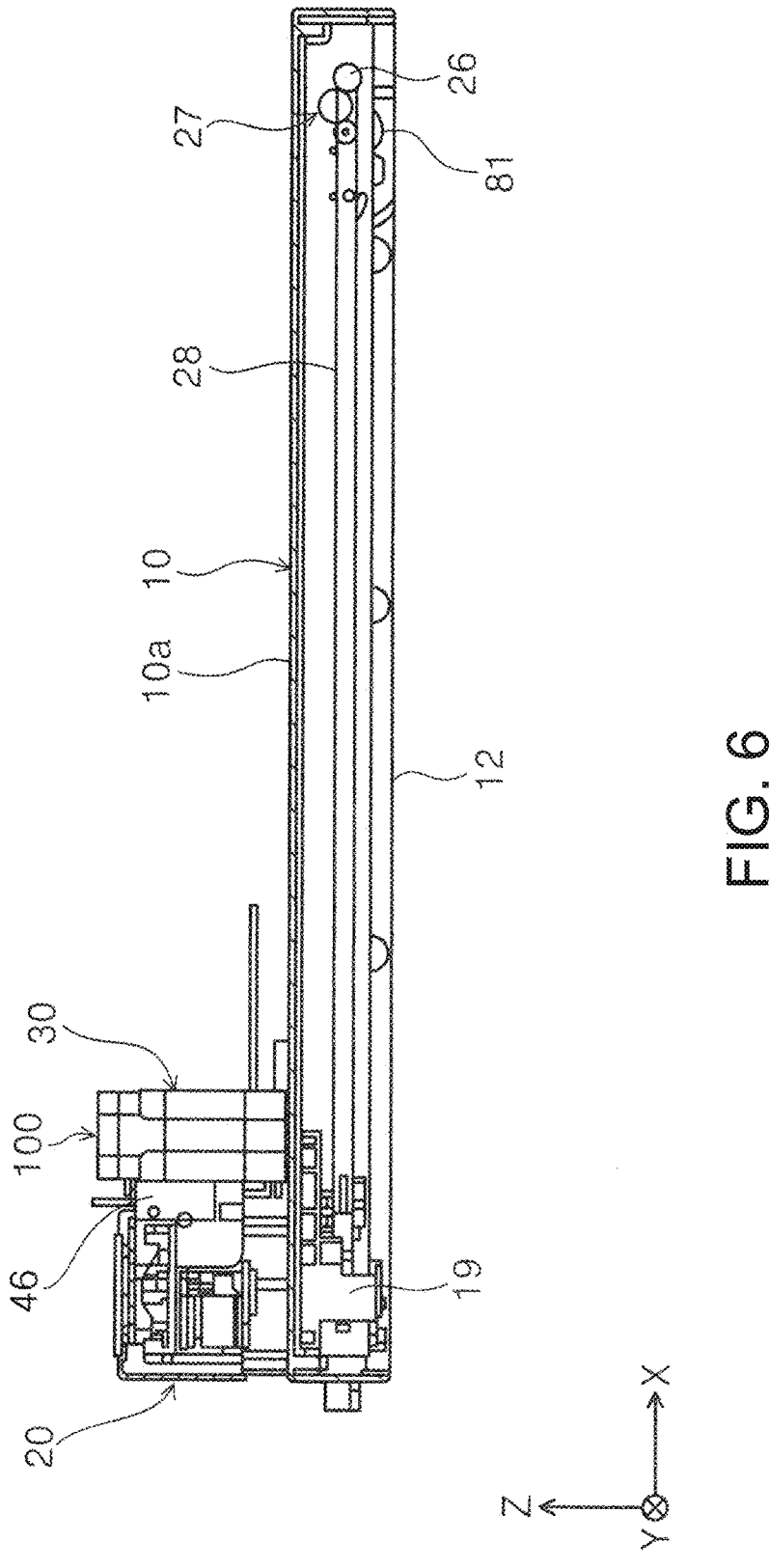
FIG. 6 is a cross-sectional view of the colorimetry device.

As shown in FIG. 5, a first guide frame 13 extending in the X-axis direction is provided at a position closer to the −Y direction in the lower frame 12. A gantry slider 19 (see FIG. 6) guided by the first guide frame 13 is provided to a lower end portion of the first frame 22A constituting the gantry 20. The gantry slider 19 is fixed to a part of an endless belt 28 as shown in FIG. 6.

The endless belt 28 is wound around a drive pulley 26 positioned at an end portion in the +X direction and a driven pulley (not shown) positioned at an end portion in the −X direction. Driving force of a gantry motor 81 is transmitted from the gantry motor 81 to the drive pulley 26 via a transmission section 27. When the gantry motor 81 rotates, the endless belt 28 rotates around and the gantry 20 moves in the X-axis direction.

A similar structure is also provided at the end portion in the +Y direction. As shown in FIG. 5, a second guide frame 14 extending in the X-axis direction is provided at a position closer to the +Y direction in the lower frame 12. A gantry slider (not shown) guided by the second guide frame 14 is provided at a lower end portion of the second frame 22B constituting the gantry 20. The gantry slider is fixed to a part of an endless belt (not shown).

Power of the gantry motor 81 is transmitted to the endless belt (not shown) via a transmission shaft 15, thereby transmitting the driving force in the X-axis direction to the gantry 20.

That is, power from the gantry motor 81 is transmitted to the gantry 20 at two positions in the Y-axis direction.

Next, in FIG. 5, a beam section frame 22C is provided with a carriage slider 45. The carriage slider 45 is provided in the beam section frame 22C so as to be slidable in the Y-axis direction. The carriage 30 is attached to the carriage slider 45.

A carriage motor 82 is provided on the first frame 22A constituting the gantry 20. A drive pulley 23 is provided on a motor shaft of the carriage motor 82. A driven pulley 24 is provided at an end portion of the beam section frame 22C in the +Y direction. An endless belt 25 is wound around the drive pulley 23 and the driven pulley 24, and the carriage slider 45 is fixed to a part of the endless belt 25. Therefore, when the carriage motor 82 rotates, the endless belt 25 rotates around, and the carriage slider 45 and the carriage 30 move in the Y-axis direction.

Figure 7:
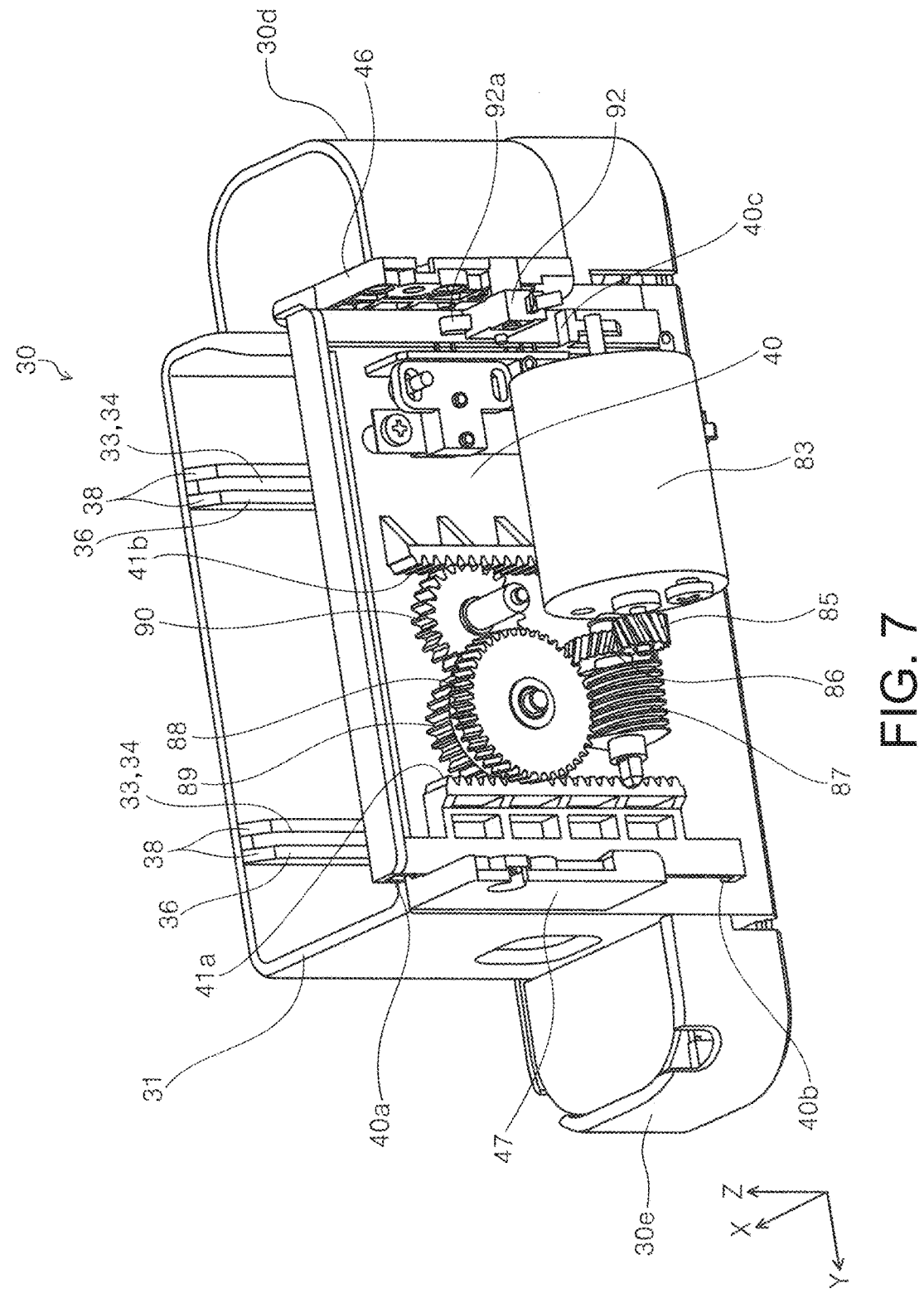
FIG. 7 is a perspective view of a mechanism of raising and lowering the carriage.
Figure 8:
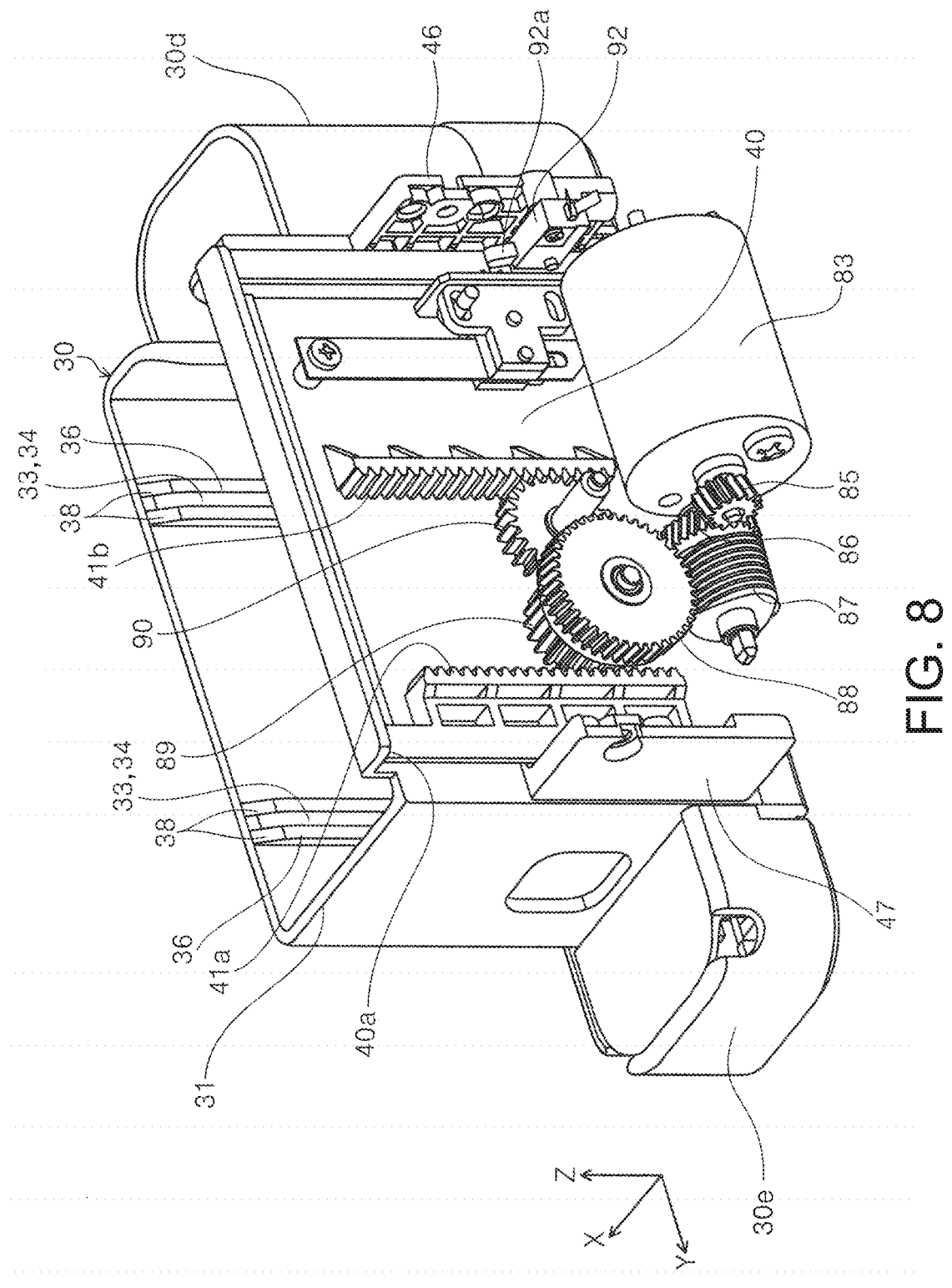
FIG. 8 is a perspective view of the mechanism of raising and lowering the carriage.

In FIG. 5, reference symbol 80 denotes a control section. The control section 80 controls the gantry motor 81, the carriage motor 82, and a raising and lowering motor 83 (to be described later) (FIGS. 7 and 8). The gantry motor 81 is an example of a first motor, the carriage motor 82 is an example of a second motor, and the raising and lowering motor 83 is an example of a third motor.

Figure 3:
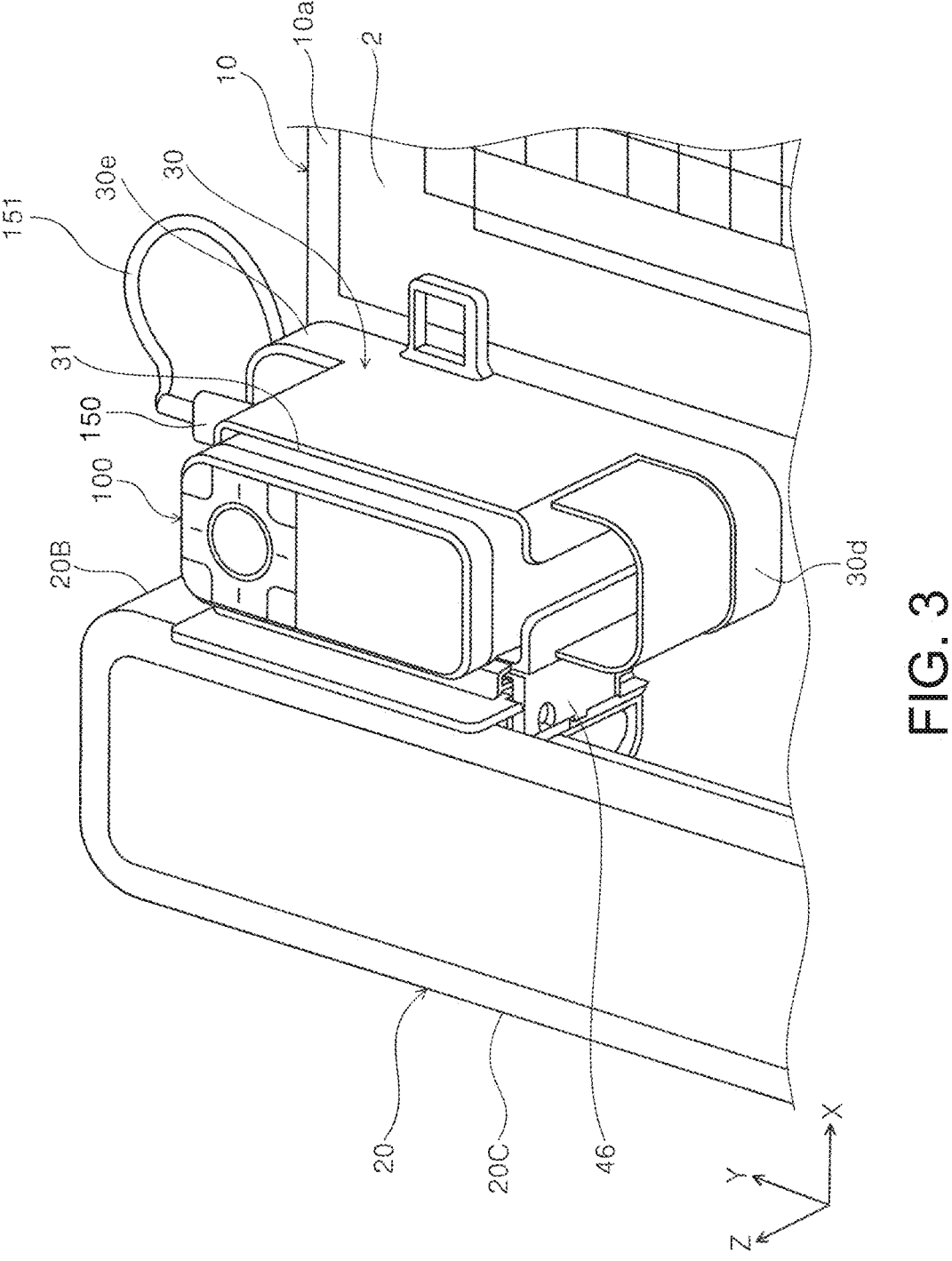
FIG. 3 is a perspective view of a carriage on which the colorimeter is mounted.
Figure 4:
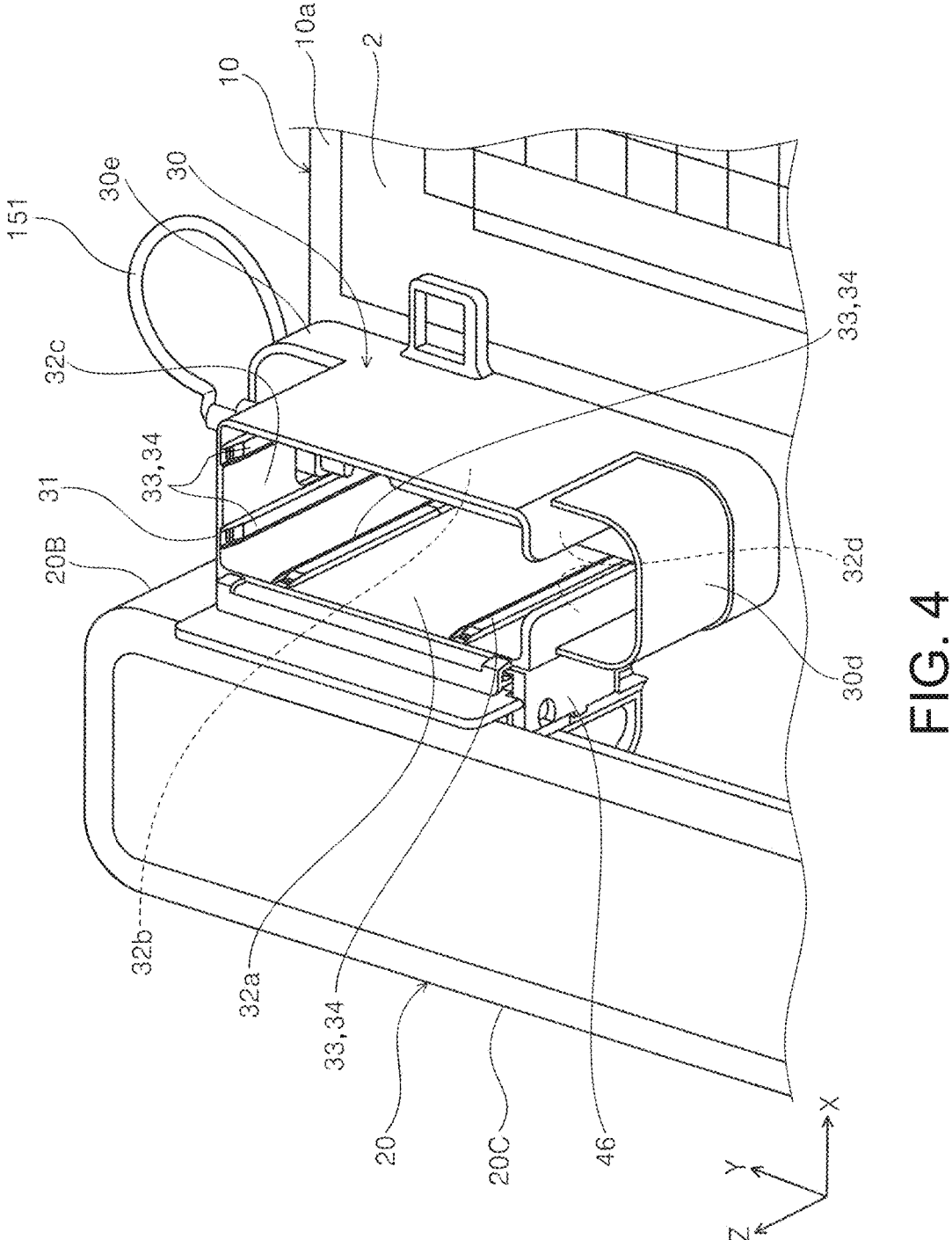
FIG. 4 is a perspective view of the carriage from which the colorimeter is removed.

As shown in FIGS. 3 and 4, the carriage 30 has an accommodation section 31 for accommodating the colorimeter 100. The accommodation section 31 constitutes a housing of the carriage 30. The accommodation section 31 is open in the +Z direction and the −Z direction, and the colorimeter 100 can be mounted to the accommodation section 31 by dropping the colorimeter 100 into the accommodation section 31 from above to below. The opening section 106 of the colorimeter 100 can be exposed toward the color chart 2 in a state in which the colorimeter 100 is mounted on the accommodation section 31.

The colorimeter 100 can be removed by lifting the colorimeter 100 upward in a state in which the colorimeter 100 is mounted in the accommodation section 31.

A front overhang section 30d is provided integrally with the accommodation section 31 in the −Y direction with respect to the accommodation section 31, and a rear overhang section 30e is provided integrally with the accommodation section 31 in the +Y direction with respect to the accommodation section 31.

Figure 15:
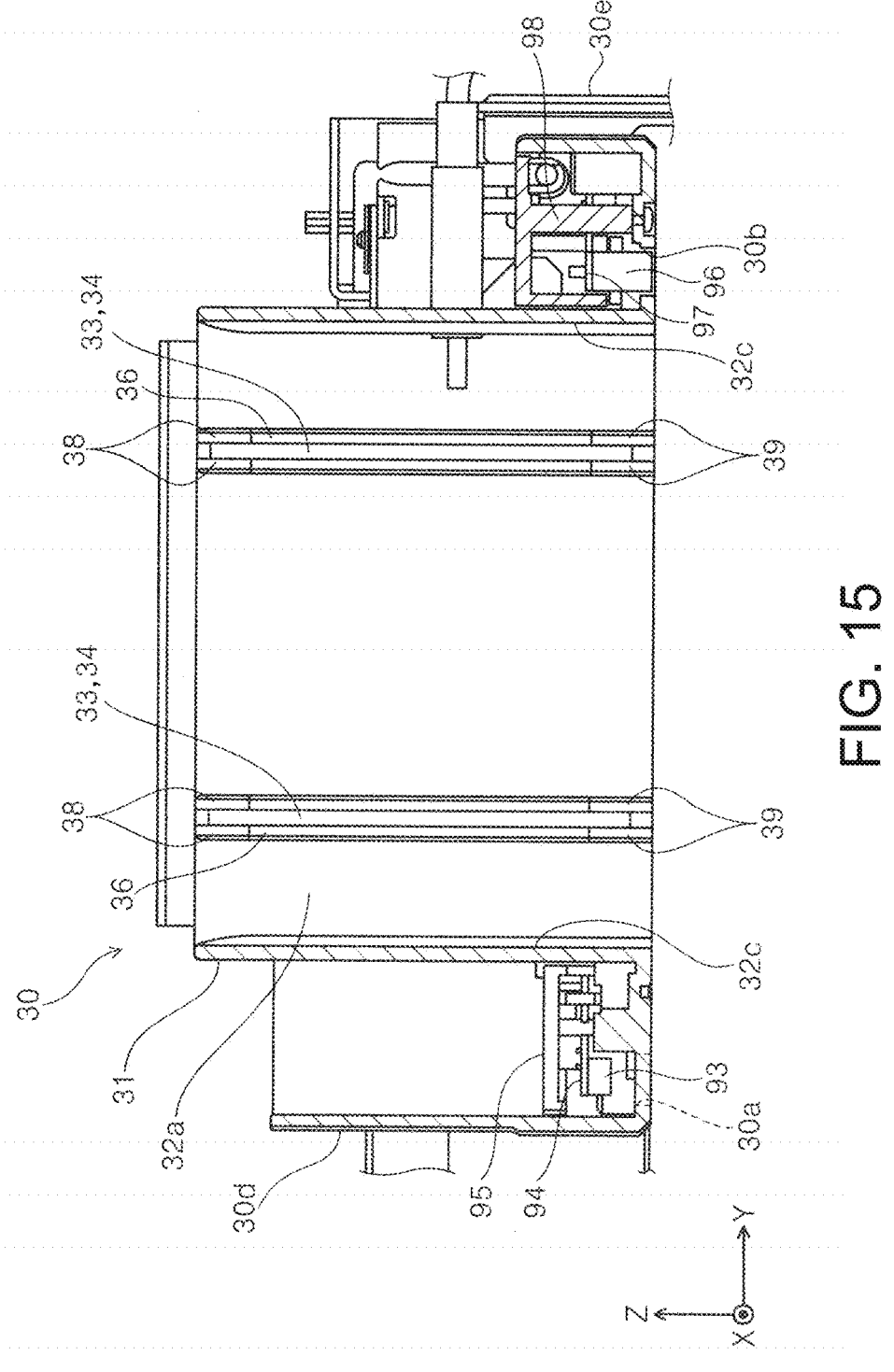
FIG. 15 is a cross-sectional view of the carriage.

As shown in FIG. 15, a front opening section 30a is formed at the bottom of the front overhang section 30d, and a front sensor 93 is provided at a position facing the front opening section 30a. The front sensor 93 is provided on a board 94. The board 94 is provided in a state of being sandwiched between a bottom portion of the front overhang section 30d and a fixing member 95. The front sensor 93 includes and constitutes a light emitting section (not shown) that emits detection light and a light receiving section (not shown) that receives reflected light.

Similarly, a rear opening section 30b is formed at the bottom of the rear overhang section 30e, and a rear sensor 96 is provided at a position facing the rear opening section 30b. The rear sensor 96 is provided on a board 97. The board 97 is provided in a state of being sandwiched between a bottom portion of the rear overhang section 30e and a fixing member 98. The rear sensor 96 includes and constitutes a light emitting section (not shown) for emitting detection light and a light receiving section (not shown) for receiving reflected light.

The front sensor 93 and the rear sensor 96 emit detection light to the color chart 2 and receive reflected light from the color chart 2. A black frame 4 is formed around the color patch 3 in the color chart 2 (see FIG. 2), and the control section 80 grasps the current position of the carriage 30 with respect to the color chart 2 by detecting the black frame 4 using the front sensor 93 and the rear sensor 96.

Next, as shown in FIGS. 7 and 8, a driven wall 40 is provided integrally with the accommodation section 31 in the −X direction with respect to the accommodation section 31. Although the carriage slider 45 is not shown in FIGS. 7 and 8, a front attachment section 46 is fixed in the −Y direction, and a rear attachment section 47 is fixed in the +Y direction, with respect to the carriage slider 45.

The driven wall 40, that is, the accommodation section 31, is provided to be slidable in the Z-axis direction with respect to the front attachment section 46 and the rear attachment section 47.

On the driven wall 40, rack sections 41a and 41b are provided along the Z-axis direction so as to face each other. A first pinion gear 89 meshes with the rack section 41a and a rack pinion mechanism is constituted by the rack section 41a and the first pinion gear 89. A second pinion gear 90 meshes with the rack section 41b and a rack and pinion mechanism is constituted by the rack section 41b and the second pinion gear 90.

The first pinion gear 89 is integrally provided with a worm wheel 88.

The first pinion gear 89, the worm wheel 88, and the second pinion gear 90 are provided on the beam section 20C of the gantry 20, which is not shown in FIGS. 7 and 8.

A raising and lowering motor 83, a driven gear 86, and a worm gear 87 are provided on the beam section 20C of the gantry 20, which is not shown in FIGS. 7 and 8. A motor shaft of the raising and lowering motor 83 is provided with a motor gear 85, and power is transmitted from the motor gear 85 to the driven gear 86. The worm gear 87 is integrally provided with the driven gear 86, and the worm wheel 88 meshes with the worm gear 87, so that a driving force is transmitted from the worm gear 87 to the worm wheel 88.

According to the above described configuration, when the raising and lowering motor 83 rotates, the accommodation section 31, that is, the carriage 30 is displaced in the Z-axis direction.

Note that the worm gear 87 has a self-locking function that prevents rotation due to load from the worm wheel 88 side while is in a state where the raising and lowering motor 83 is stopped, so a separate lock mechanism for maintaining the height of the carriage 30 is unnecessary and it is possible to reduce the size and cost of the colorimetry device 1.

The movement limit of the driven wall 40 in the +Z direction can be restricted by an upper limit restricted section 40b formed on the driven wall 40 being in contact with lower ends of the front attachment section 46 and the rear attachment section 47. In FIG. 7, only the upper limit restricted section 40b that can contact the lower end of the rear attachment section 47 is shown, and the upper limit restricted section 40b that can be in contact with the lower end of the front attachment section 46 is in a hidden position.

However, the movement limit of the driven wall 40 in the +Z direction in the present embodiment is restricted by a detection signal of an upper limit sensor 92. That is, the beam section 20C of the gantry 20 (not shown in FIGS. 7 and 8) is provided with the upper limit sensor 92, and a detection section 92a of the upper limit sensor 92 is configured to be able to contact a detection target section 40c formed on the driven wall 40. When the driven wall 40 is raised, the detection target section 40c is in contact with the detection section 92a of the upper limit sensor 92, as shown by the change from FIG. 7 to FIG. 8, and thereby the detection signal of the upper limit sensor 92 changed. The control section 80 (see FIG. 5) which raises the carriage 30 stops the raising and lowering motor 83 based on the change in the detection signal of the upper limit sensor 92.

The movement limit of the driven wall 40 in the −Z direction can be restricted by a lower limit restricted section 40*a* formed on the driven wall 40 being in contact with the upper ends of the front attachment section 46 and the rear attachment section 47. In FIG. 7, only the lower limit restricted section 40*a* that can contact the upper end of the rear attachment section 47 is shown, and the lower limit restricted section 40*a* that can contact the upper end of the front attachment section 46 is in a hidden position.

However, actually, the movement limit of the driven wall 40, that is, the carriage 30 in the −Z direction, is restricted by a bottom surface 30*c* (see FIGS. 9 to 12) of the carriage 30 contacting the support surface 10*a* or the color chart 2.

Here, the height control of the carriage 30 by the control section 80 will be described with reference to FIGS. 9 to 12. In FIGS. 9 to 12, sheet material 34 (contact surface 33) is indicated by a thick dashed line for convenience of illustration. FIGS. 9 to 12 schematically show the colorimetry device 1 and the colorimeter 100.

Figure 9:
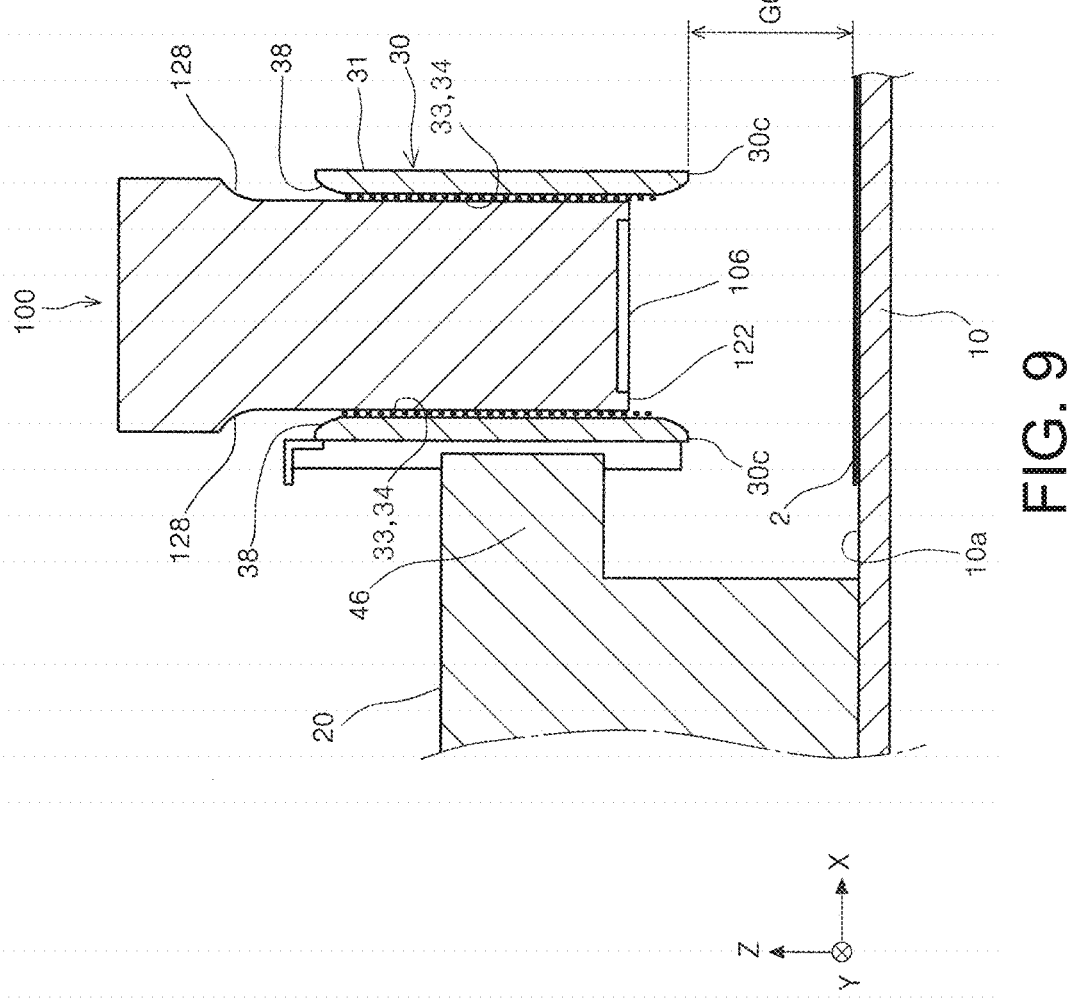
FIG. 9 is a view schematically showing a positional relationship between the carriage and the colorimeter when the colorimeter is mounted on the carriage.

As shown in FIG. 9, when the colorimeter 100 is mounted on the accommodation section 31 of the carriage 30, a gap G0 is provided between the bottom surface 30*c* of the carriage 30 and the color chart 2 in the Z-axis direction. This position is referred to as a mounting position of the accommodation section 31. When the colorimeter 100 is mounted into or removed from the accommodation section 31, the control section 80 of the colorimetry device 1 positions the accommodation section 31 at the mounting position.

Support sections 38 are provided at the upper portion of the accommodation section 31, and when the colorimeter 100 is accommodated in the accommodation section 31, the overhang portion 128 of the colorimeter 100 catches on the support sections 38. That is, in a state where the colorimeter 100 is mounted on the carriage 30, the support sections 38 support the overhang portion 128, whereby the position of the colorimeter 100 in the Z-axis direction with respect to the carriage 30 is determined.

In this state, the bottom surface 122 of the colorimeter 100 protrudes downward from the bottom surface 30*c* of the carriage 30.

Figure 10:
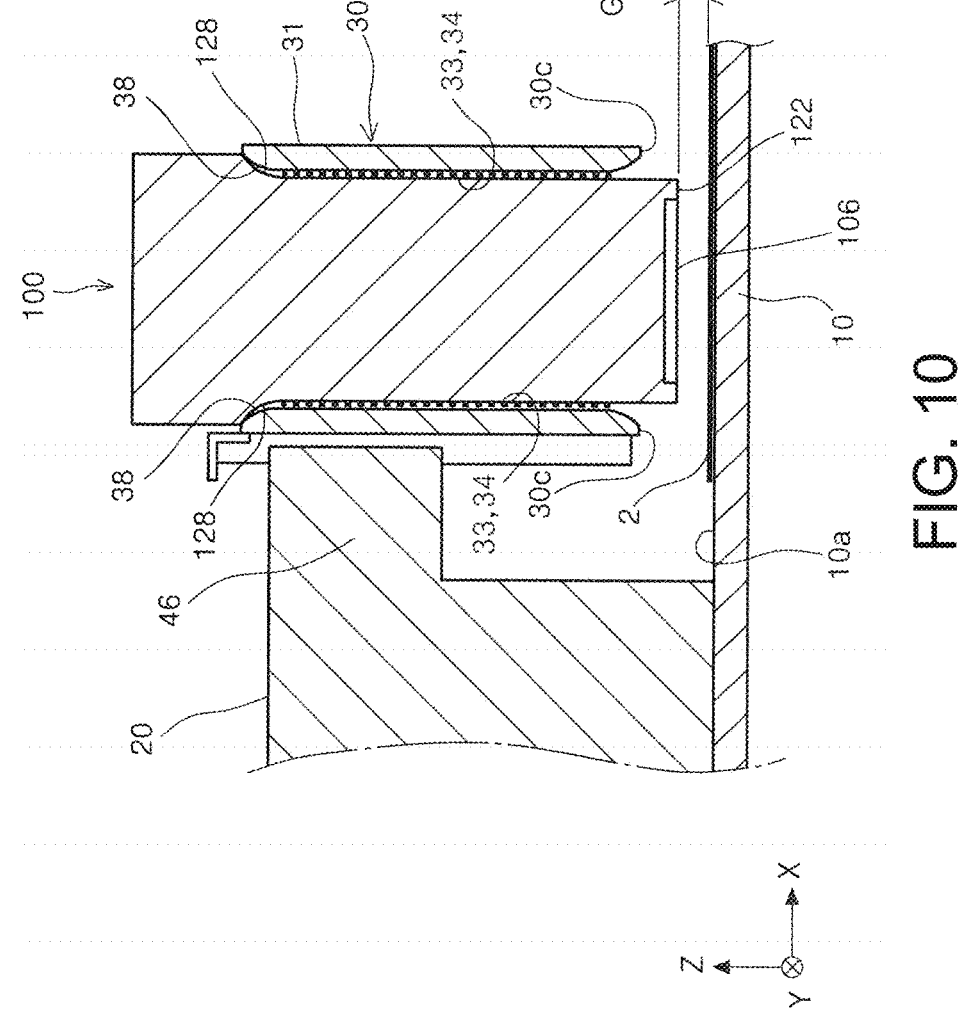
FIG. 10 is a diagram schematically showing the positional relationship between the carriage and the colorimeter when the carriage moves along a colorimetry target.

When the carriage 30 is moved with respect to the color chart 2 after the colorimeter 100 is mounted, the control section 80 provides a gap G1 between the bottom surface 122 of the colorimeter 100 and the color chart 2 as shown in FIG. 10.

Figure 11:
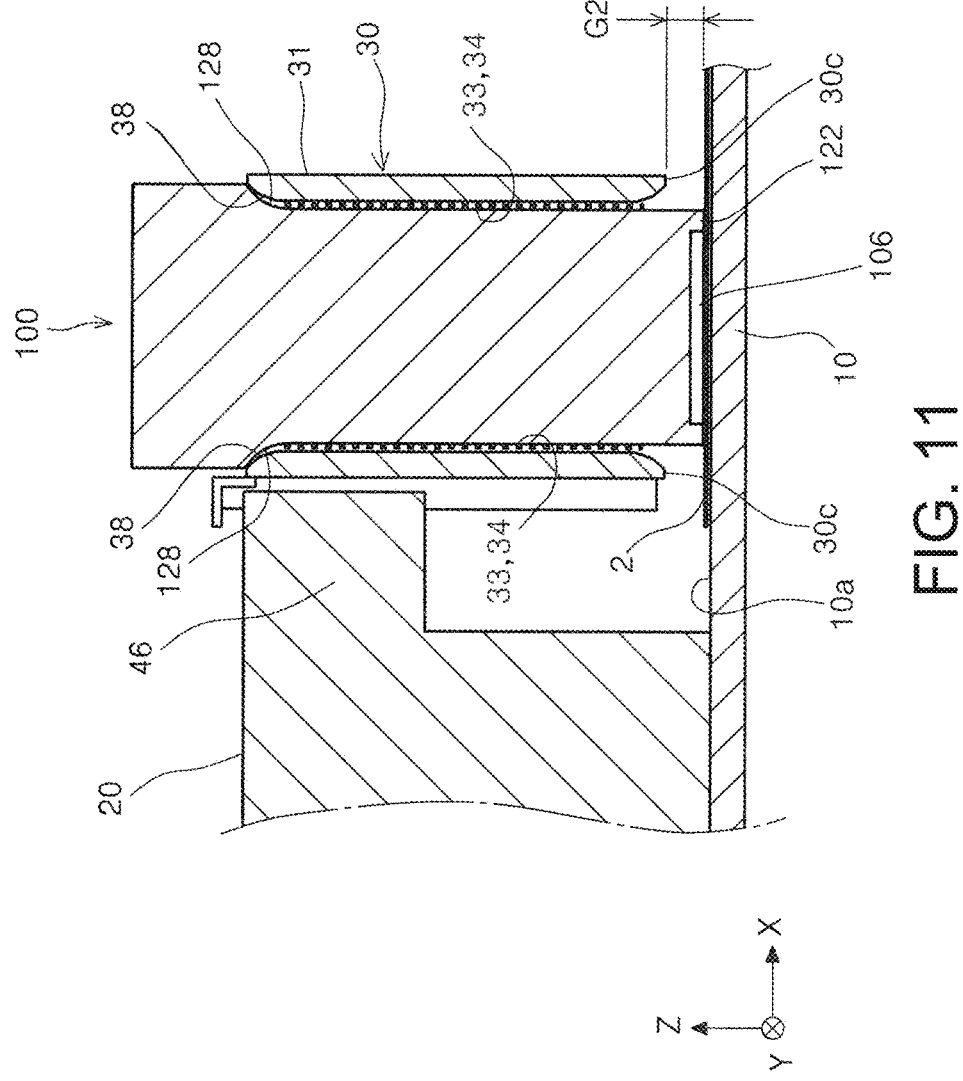
FIG. 11 is a diagram schematically showing the positional relationship between the carriage and the colorimeter when the bottom surface of the colorimeter is in contact with the colorimetry target.

Next, when colorimetry is performed, the control section 80 lowers the carriage 30 to a position where the bottom surface 122 of the colorimeter 100 is in contact with the color chart 2 as shown by a change from FIG. 10 to FIG. 11. The reference symbol G2 in FIG. 11 indicates a Z-axis direction gap between the bottom surface 30*c* of the carriage 30 and the color chart 2 at the moment when the bottom surface 122 of the colorimeter 100 contacts the color chart 2.

Figure 12:
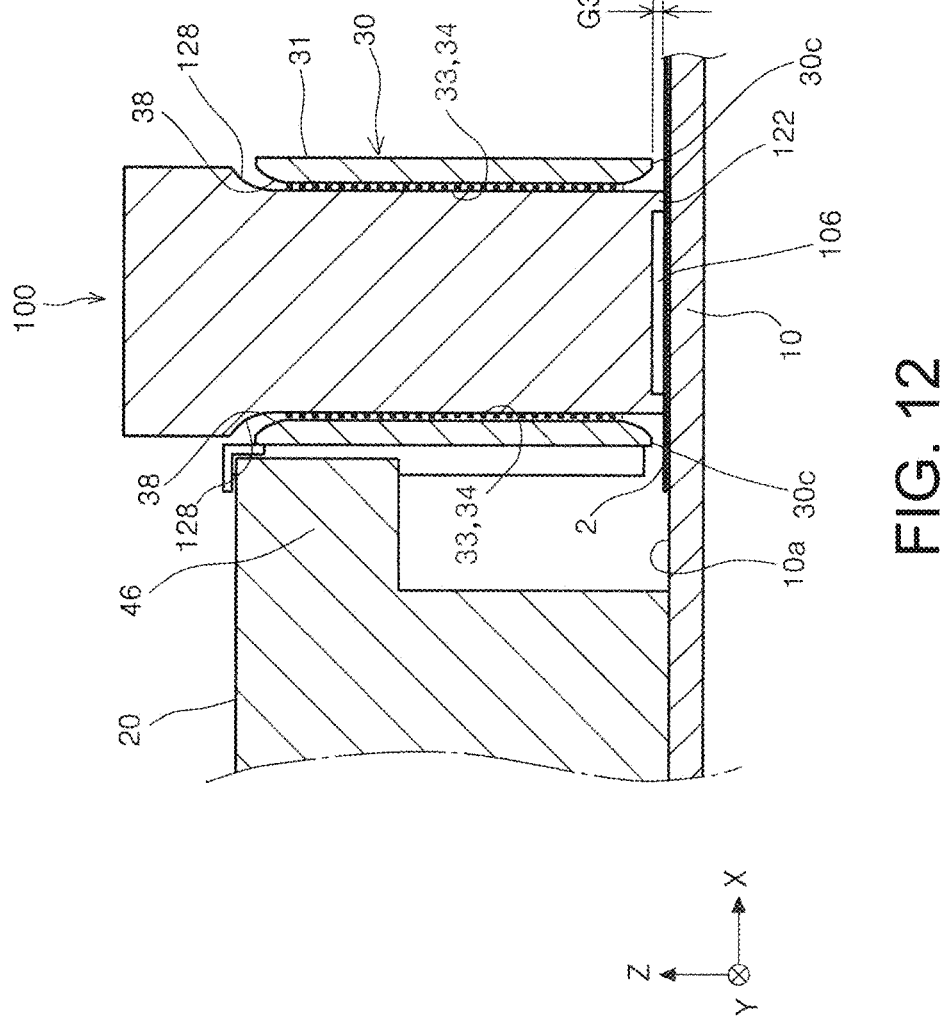
FIG. 12 is a diagram schematically showing the positional relationship between the carriage and the colorimeter when measuring colors of the colorimetry target.

The control section 80 further lowers the carriage 30 from this state as shown by the change from FIG. 11 to FIG. 12, and performs colorimetry in this state. In FIG. 12, reference symbol G3 denotes a Z-axis direction gap between the bottom surface 30*c* of the carriage 30 and the color chart 2 when colorimetry is performed.

In the state of FIG. 12, the state in which the support sections 38 provided at the upper end of the accommodation section 31 support the overhang portion 128 of the colorimeter 100 is released, and the overhang portion 128 is separated from the support sections 38 in the +Z direction.

In such a state that the support sections 38 support the colorimeter 100, the colorimeter 100 protrudes from the bottom surface 30*c* of the accommodation section 31 (carriage 30) toward the support base 10, and when performing colorimetry of the color chart 2 by the colorimeter 100, the control section 80 lowers the carriage 30 to a position where the bottom surface 122 of the colorimeter 100 contacts the color chart 2, and then further performs lowering control for lowering the carriage 30 within a range where the bottom surface 30*c* of the carriage 30 does not contact the color chart 2.

During the lowering control, the contact surface 33 (to be described later) provided on the inner side of the accommodation section 31 and the side surface of the colorimeter 100 rub against each other.

Next, the contact surface 33 provided on the inner wall of the accommodation section 31 will be described.

The inner wall of the accommodation section 31 in FIG. 4 is along the vertical direction, specifically a first wall surface 32*a* and a second wall surface 32*b* parallel to the Y-Z plane, and a third wall surface 32*c* and a fourth wall surface 32*d* parallel to the X-Z plane. The first wall surface 32*a* and the second wall surface 32*b* face each other, also the third wall surface 32*c* and the fourth wall surface 32*d* face each other.

Hereinafter, the first wall surface 32*a*, the second wall surface 32*b*, the third wall surface 32*c*, the fourth wall surface 32*d*, may be collectively referred to as "wall surfaces".

Each wall surface is provided with the contact surface 33 that contacts side surfaces of the colorimeter 100 when the colorimeter 100 is being attached or detached.

In the present embodiment, the contact surface 33 protrudes from each wall surface. By this, when the colorimeter 100 is attached or detached, the wall surfaces contact the side surfaces of the colorimeter 100, and the contact surface 33 contacts the side surfaces of the colorimeter 100.

Here, a friction coefficient μ1 between the contact surface 33 and side surfaces of the colorimeter 100 is smaller than a friction coefficient μ2 between the accommodation section 31, which is the housing of the carriage 30, and the side surfaces of the colorimeter 100. In other words, the friction coefficient μ1 between the contact surface 33 and the side surfaces of the colorimeter 100 is smaller than the friction coefficient μ2 between a region of the inner wall of the accommodation section 31 excluding the contact surface 33 and the side surfaces of the colorimeter 100.

This makes it possible to reduce the frictional resistance when the colorimeter 100 is attached to or detached from the carriage 30. As a result, it is possible to prevent the carriage 30 from being damaged due to an excessive load applied to the carriage 30 when the colorimeter 100 is attached or detached.

Figure 13:
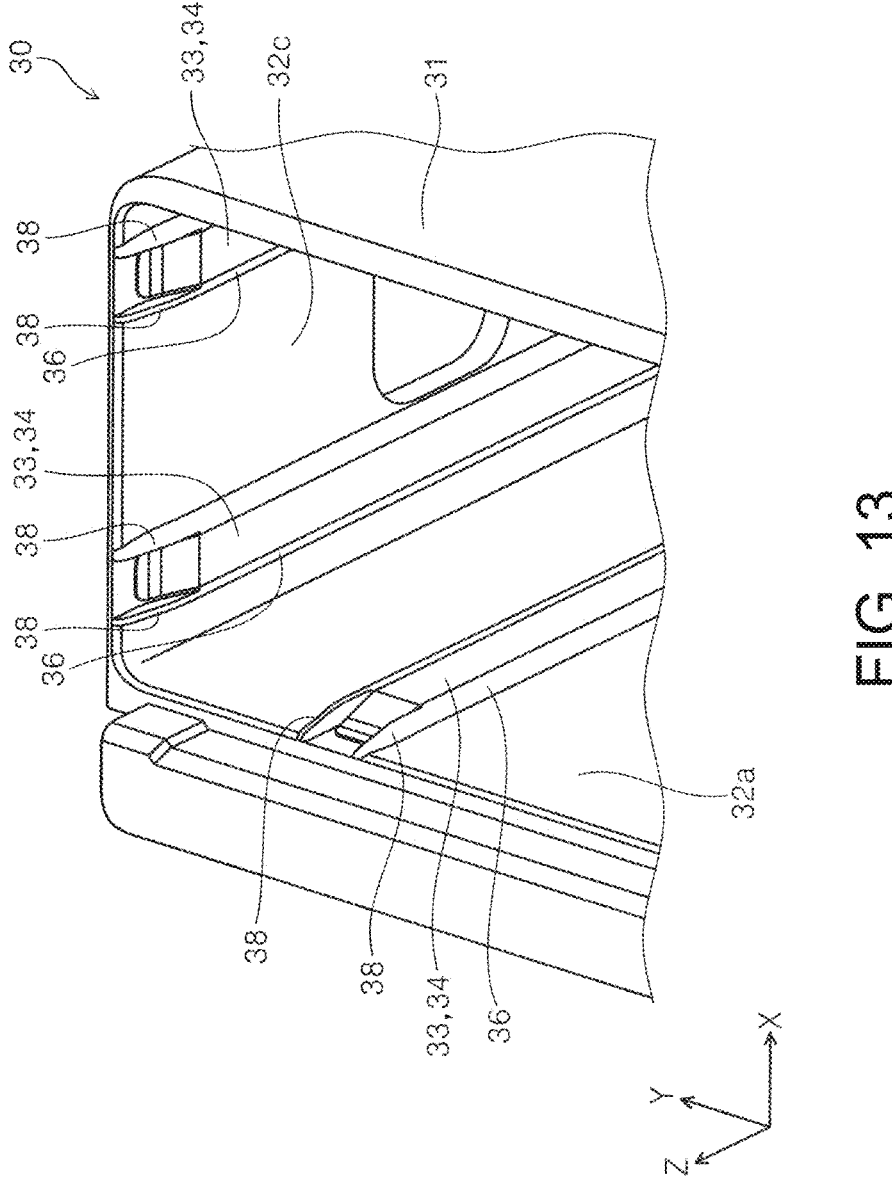
FIG. 13 is an enlarged perspective view of a contact surface of the carriage with which the colorimeter is in contact.
Figure 14:
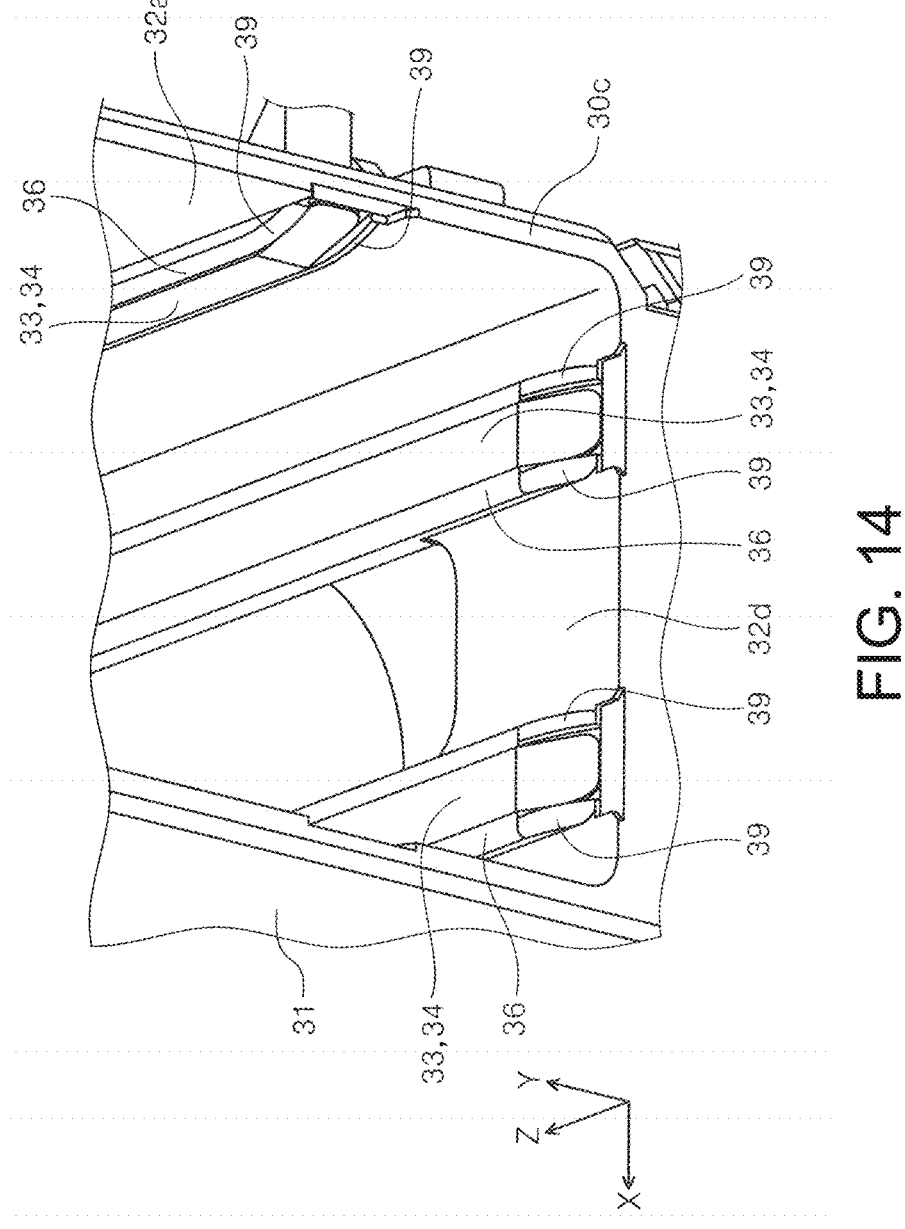
FIG. 14 is an enlarged perspective view of the contact surface of the carriage with which the colorimeter is in contact.

Hereinafter, the contact surface 33 will be further described. In each wall surface of the accommodation section 31, as an example, opposing sections 36 extending in the vertical direction is provided with a gap opened therebetween along the horizontal direction, as shown in FIGS. 13 and 14. The contact surface 33 is provided extending in the vertical direction on the opposing sections 36.

The support sections 38 described above are disposed on an upper portion of the opposing sections 36 with a gap opened therebetween along the horizontal direction. The support sections 38 are formed in a rib shape, extend in a direction away from the side surfaces of the colorimeter 100, and have a curved surface along the curved surface of the overhang portion 128 of the colorimeter 100 in the present embodiment.

The opposing sections 36 extend in a direction away from the side surfaces of the colorimeter 100 between two support sections 38. An upper end portion of the sheet material 34 (to be described later) enters between two support sections 38. As a result, the contact surface 33, that is, the upper end portion of the sheet material 34, extends in a direction away from the side surfaces of the colorimeter 100. Accordingly, it is possible to suppress the colorimeter 100 from being caught by the contact surface 33, that is, the upper end portion of the sheet material 34, when the colorimeter 100 is accommodated in the carriage 30.

A lower portion of the opposing sections 36 has the same configuration as the upper portion. As shown in FIG. 14, two ribs 39 are disposed at a lower portion of the opposing sections 36 with a gap opened between each other in the horizontal direction. The ribs 39 extend in a direction away from each side of the colorimeter 100. The opposing sections 36 extend in a direction away from the side surfaces of the colorimeter 100 between two ribs 39. The contact surface 33, that is, the lower end portion of the sheet material 34, enters between the two ribs 39. As a result, the contact surface 33, that is, the lower end portion of the sheet material 34 extends in a direction away from the side surfaces of the colorimeter 100.

Accordingly, when the colorimeter 100 is removed from the carriage 30, it is possible to suppress the colorimeter 100 from being caught on the contact surface 33, that is, the lower end portion of the sheet material 34.

In the present embodiment, the contact surface 33 is formed of the sheet material 34 attached to the inner wall of the accommodation section 31, specifically, to the opposing sections 36. Since the sheet material 34 has a predetermined thickness, when the sheet material 34 is attached to the opposing sections 36, the side surfaces of the colorimeter 100 contact the sheet material 34.

The sheet material 34 is a low friction sheet, and as an example, a high molecular polyethylene sheet, a fluororesin sheet, a nylon sheet, or the like can be used. The sheet material 34 can be attached to the opposing sections 36 with a pressure-sensitive adhesive, an adhesive, or the like.

In the present embodiment, since the contact surface 33 is formed of the sheet material 34 attached to the inner wall of the accommodation section 31 as described above, the friction coefficient μ1 can be easily adjusted.

In the present embodiment, the side surfaces of the colorimeter 100 is formed of a PC/ABS resin, and each wall surface of the accommodation section 31 is formed of an ABS resin.

Note that instead of the form of attaching the sheet material 34 to the opposing sections 36, the opposing sections 36 may be configured as independent members and may be attached to the accommodation section 31 as well as being formed of a low friction material. In this case, for example, the opposing sections 36 can be formed of POM (polyoxymethylene).

In the present embodiment, the contact surface 33 is provided on all side surfaces of the first wall surface 32a, the second wall surface 32b, the third wall surface 32c, and the fourth wall surface 32d, but may be provided on any one side surface, or may be provided only on two side surfaces that face each other.

However, as in the present embodiment, by providing the contact surface 33 on all of the side surfaces of the first wall surface 32a, the second wall surface 32b, the third wall surface 32c, and the fourth wall surface 32d, it is possible to effectively reduce the frictional resistance when the colorimeter 100 is attached to and detached from the carriage 30.

The contact surface 33 in the present embodiment extends in the vertical direction and is disposed with a gap opened along the horizontal direction. Thus, the contact area with the side surfaces of the colorimeter 100 can be reduced as compared with a configuration in which the contact surface 33 is provided over the entire region of the inner wall of the accommodation section 31, it is possible to effectively reduce the frictional resistance when the colorimeter 100 is attached to and detached from the carriage 30. In the present embodiment, two contact surfaces 33 are provided on each wall surface with a gap opened therebetween in the horizontal direction, but only one contact surface 33 or three or more contact surfaces 33 may be provided.

Further, in the present embodiment, among the side surfaces of the colorimeter 100, the right side surface 125 and the left side surface 126 have the overhang portion 128 protruding toward the side. Thus, the colorimeter 100 can be easily held, and the handling property of the colorimeter 100 is improved.

In addition, since the accommodation section 31 of the carriage 30 is provided, on the upper portion of the inner wall, with the support sections 38 for supporting the colorimeter 100 by catching the overhang portion 128, the relative position between the carriage 30 and the colorimeter 100 in the attachment and detachment direction of the colorimeter 100 is easily determined, and it is possible to suppress the variation in the relative position.

Note that if the contact surface 33 is configured to be extended to the support sections 38 and to be in contact with the overhang portion 128 of the colorimeter 100, the following effects can be obtained.

That is, in a state in which the support sections 38 support the overhang portion 128, the support sections 38 and the overhang portion 128 are in intimate contact with each other and easily cling to each other, so that a load may be applied to the carriage 30 when the colorimeter 100 is removed from the carriage 30. In addition, as shown in the change from FIG. 11 to FIG. 12, the carriage 30 further descends from the state where the bottom surface 122 of the colorimeter 100 is in contact with the color chart 2, when the colorimeter 100 moves upward relative to the accommodation section 31, if the support sections 38 and the overhang portion 128 are in intimate contact with each other, there is a possibility that a load will be applied to the carriage 30.

However, as described above, when the contact surface 33 is configured to extend to the support sections 38 and contact the overhang portion 128 of the colorimeter 100, it is possible to prevent the support sections 38 and the overhang portion 128 from being in intimate contact with each other, and thus it is possible to prevent a load from being applied to the carriage 30 when the colorimeter 100 is removed from the carriage 30 or when the carriage 30 is lowered during colorimetry.

Further, the carriage 30 is a portion having a shape extending in the Y-axis direction and is provided on the gantry 20 that is movable in the X-axis direction with respect to the support base 10 by the power of the gantry motor 81. The carriage 30 is provided so as to be movable in the Y-axis direction with respect to the gantry 20 by the power of the carriage motor 82. Further, the carriage 30 is provided so as to be movable in the Z-axis direction with respect to the gantry 20 by the power of the raising and lowering motor 83.

Since the carriage 30 is movable in the three axial directions in this manner, the degree of freedom of positioning control of the carriage 30 is improved.

As described above, when the colorimeter 100 measures the color of the color chart 2, the control section 80 lowers the carriage 30 to a position where the bottom surface 122 of the colorimeter 100 contacts the color chart 2, and then further performs lowering control for lowering the carriage 30 within a range where the bottom surface 30c of the carriage 30 does not contact the color chart 2. As a result, variation in the relative position between the colorimeter 100 and the color chart 2 in the Z-axis direction can be suppressed and an appropriate colorimetry result can be obtained. In addition, since it is difficult for external light to enter the inside of the device through the opening section 106 provided in the bottom surface 122 of the colorimeter 100, an appropriate color measurement result can be obtained.

During the lowering control, the contact surface 33 and the side surfaces of the colorimeter 100 rub against each other, and the colorimeter 100 is pressed against the color chart 2 by the friction between the contact surface 33 and the side surfaces of the colorimeter 100. However, since the friction coefficient μ1, which is the friction coefficient between the contact surface 33 and the side surfaces of the colorimeter 100, is suppressed, the colorimeter 100 can be prevented from being strongly pressed against the color chart 2, and the colorimeter 100 can be prevented from damaging the color chart 2.

Figure 16:
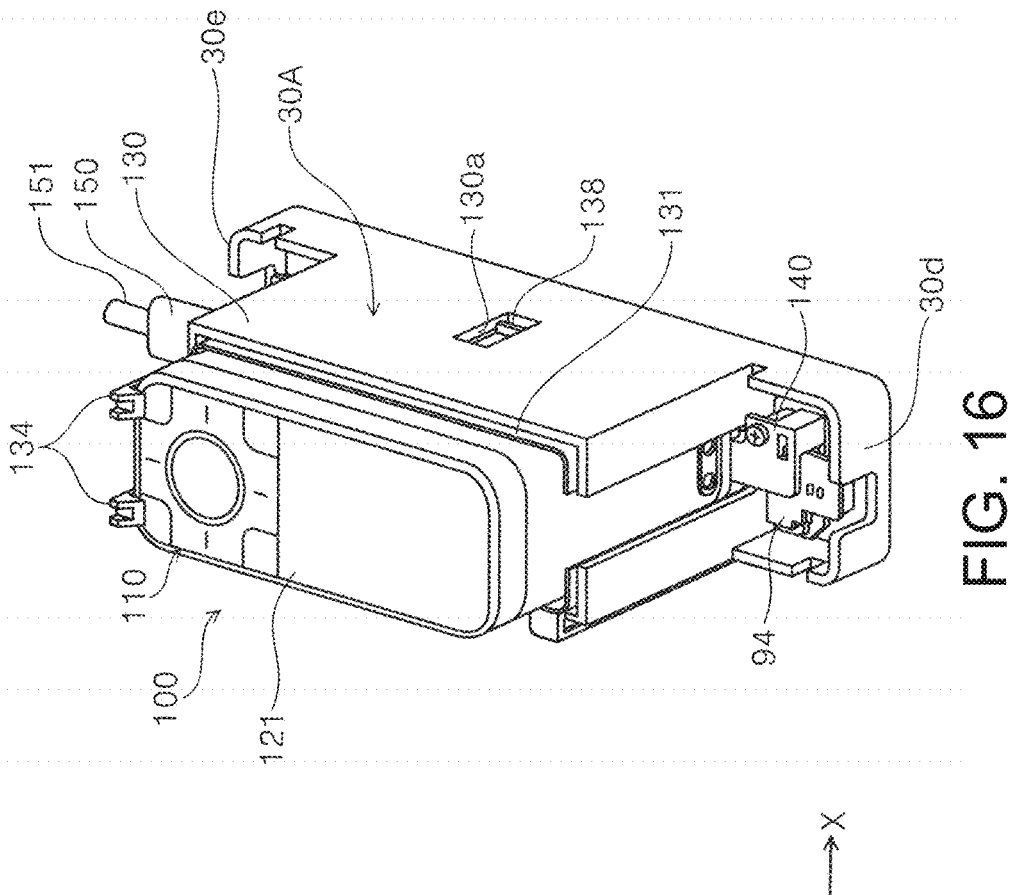
FIG. 16 is a perspective view of the carriage.

Next, another embodiment of the carriage will be described. In FIG. 16 and subsequent drawings, the same components as those described above are denoted by the same reference symbols, and a duplicate description thereof will be avoided.

A carriage 30A shown in FIG. 16 includes an outer housing 130 forming an outer shell, and a case 131 accommodated in the outer housing 130. The case 131 functions as an accommodation section for accommodating the colorimeter 100.

The case 131 is provided so as to be attached to and detached from the outer housing 130.

Figure 17:
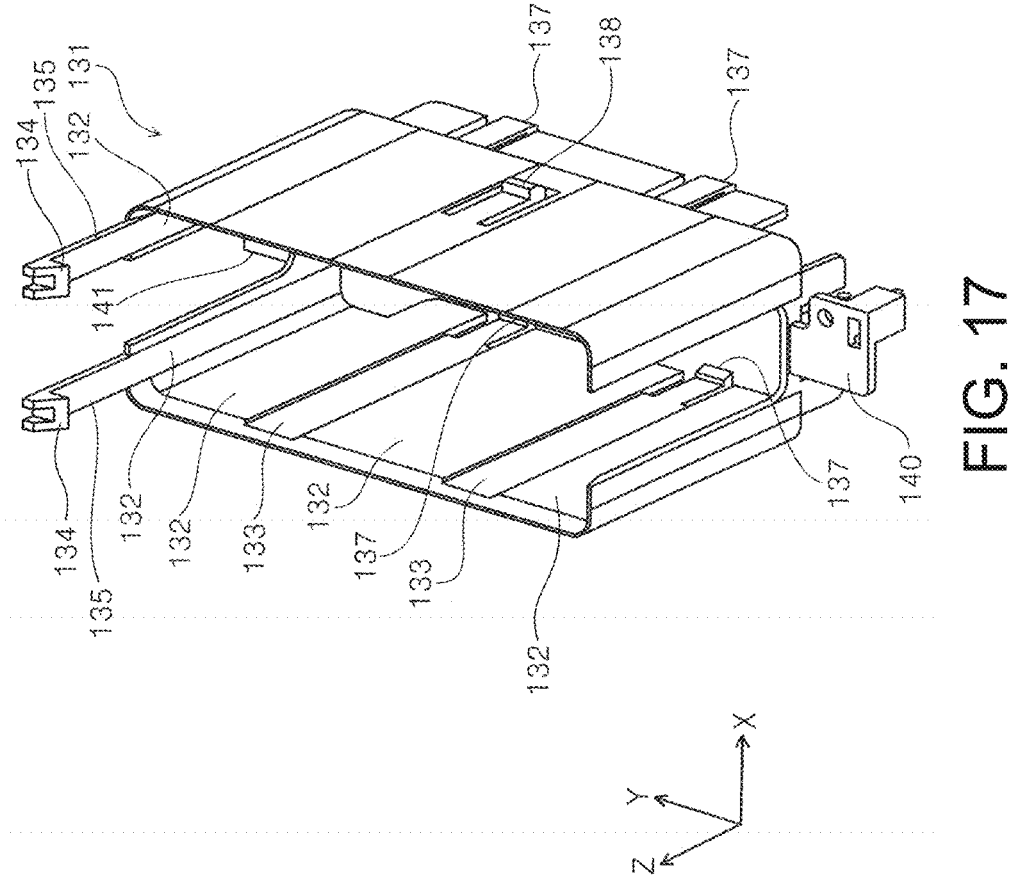
FIG. 17 is a perspective view of a case accommodated in an outer housing of the carriage.

The case 131 is open in the +Z direction and the −Z direction as shown in FIG. 17, and the colorimeter 100 can be mounted on the case 131 by dropping the colorimeter 100 from above to below into the case 131. The overhang portion 128 of the colorimeter 100 is supported by the upper edge of the case 131.

A contact surface 132 is formed on an inner wall of the case 131. In the present embodiment, the contact surface 132 is formed integrally with the case 131. That is, the contact surface 132 is formed of a material forming the case 131, and can be formed of POM (polyoxymethylene) as an example.

In the present embodiment, the friction coefficient μ1 between the contact surface 132 and the side surfaces of the colorimeter 100 becomes smaller than the friction coefficient μ2 between the outer housing 130 and the side surfaces of the colorimeter 100.

Since the contact surface 132 is formed integrally with the case 131 in this manner, the contact surface 132 can be easily obtained.

On the inner wall of the case 131, a recess sections 133 extending in the Z-axis direction are formed with a gap opened therebetween in the horizontal direction. As a result, the area of the contact surface 132 is reduced and friction between the contact surface 132 and the side surfaces of the colorimeter 100 is reduced.

In the present embodiment, not only the friction coefficient between the case 131 and the colorimeter 100 but also the friction coefficient between the case 131 and the outer housing 130 is suppressed. Thus, it is possible to smoothly attach and detach the case 131 to the outer housing 130.

Next, in the case 131, arm sections 135 rising in the +Z direction from the inner wall in the +Y direction are formed with a gap opened therebetween in the X-axis direction. A hook 134 is formed at an upper end portion of the arm sections 135.

The hook 134 can be hooked on the edge of the upper surface 121 of the colorimeter 100 as shown in FIG. 16, and can be released from the state of being hooked on the edge of the upper surface 121 of the colorimeter 100 by the elastic deformation of the arm section 135. The hook 134 is configured to have a position, shape, and size that do not obstruct the operation of the operation section 110 even in a state in which the hook is caught on the edge of the upper surface 121 of the colorimeter 100.

By hooking the hook 134 on the edge of the upper surface 121 of the colorimeter 100 in this manner, it is possible to prevent the colorimeter 100 from slipping out of the case 131 even when the colorimetry device 1 is placed in an inclined state.

The number, shape, installation position, and the like of the hook 134 can be changed as appropriate. For example, the hook 134 may be provided on the outer housing 130.

Further, not limited to the hook 134, anything may be used as long as the colorimeter 100 can be fixed to the case 131, and for example, the colorimeter 100 may be fixed to the case 131 by a string or the like.

The side surface in the +X direction in the case 131, a hook-shaped stopper section 138 is provided as shown in FIG. 17. The stopper section 138 is provided so as to be retreatable in the inner direction and protrudable in the outer direction by the elasticity of the case 131.

The outer housing 130 is formed with an elongated hole 130a extending in the Z-axis direction as shown in FIG. 16, when the case 131 is accommodated in the outer housing 130, the stopper section 138 enters the elongated hole 130a. Thus, the case 131 is restricted so as not to fall out from the outer housing 130.

In particular, in a state where the colorimeter 100 is accommodated in the case 131, the stopper section 138 cannot retreat in the inner direction, and therefore, the stopper section 138 is always engaged with the elongated hole 130a, and a state where the case 131 does not fall off from the outer housing 130 is maintained.

The stopper section 138 and the elongated hole 130a are provided on the side surface of the +X direction in the present embodiment and may be provided on other side surfaces.

Next, as shown in FIG. 17, the bottom section of the case 131 is provided with a pressing support section 137 protruding inner direction. The pressing support section 137 has a shape protruding to the inside of the case and is provided so as to be retreatable in the inner direction and protrudable in the outer direction by the elasticity of the case 131.

The pressing support section 137 functions to support the bottom portion of the colorimeter 100 when the colorimeter 100 is accommodated in the case 131. Thus, the colorimeter 100 can be more reliably supported, and the height position of the colorimeter 100 with respect to the case 131 can be more stabilized.

Figure 18:
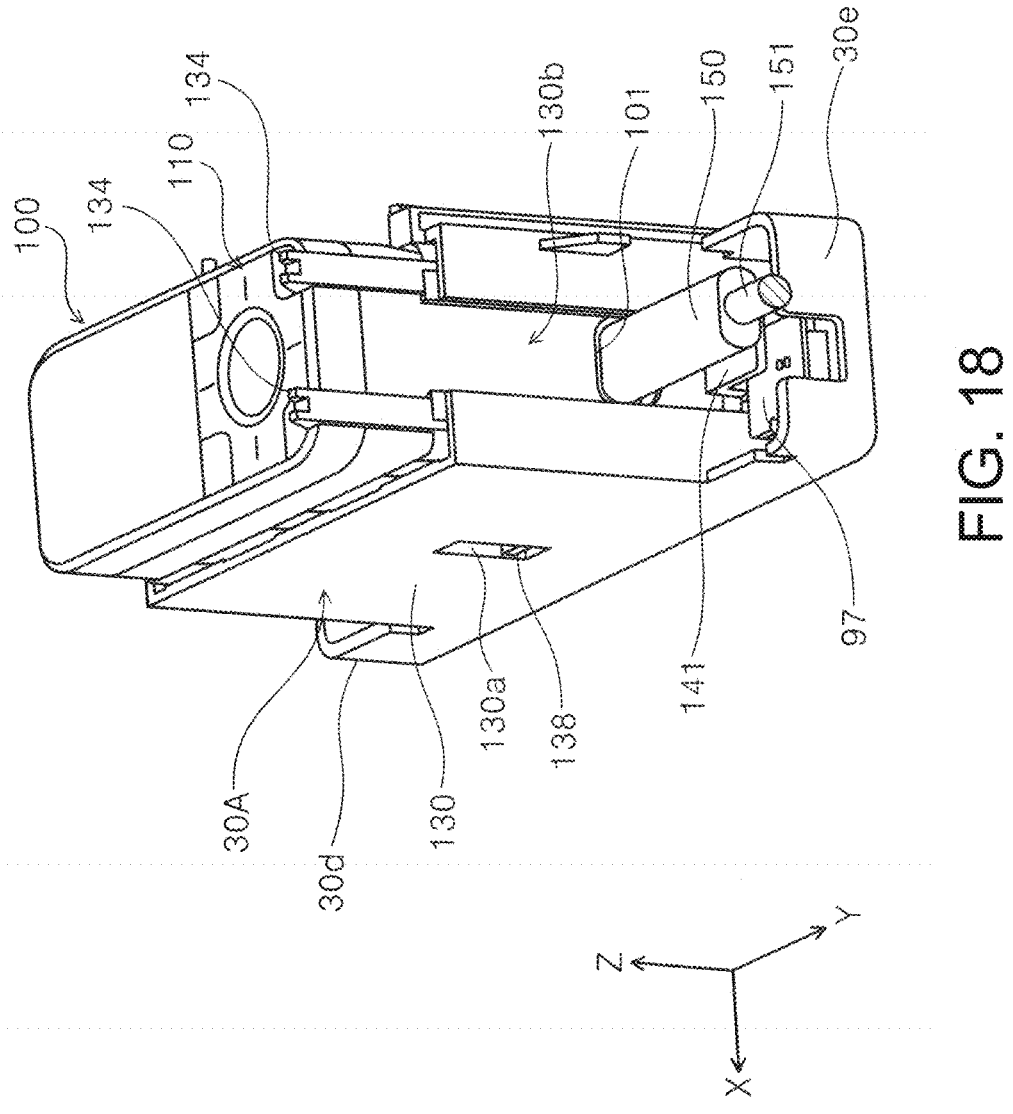
FIG. 18 is a perspective view of the carriage.

Next, as shown in FIG. 18, an opening section 130b that opens in the +Z direction is formed on a side surface of the outer housing 130 in the +Y direction. The opening section 130*b* allows the colorimeter 100 to be attached and detached while the cable connector 150 is inserted into the terminal 101, thereby improving the convenience of the user. The lower edge of the opening section 130*b* in a state of mounting the colorimeter 100 is at a height position that does not interfere with the cable connector 150 inserted into the terminal 101.

Although the opening section 130*b* in FIG. 18 is an open state, it may be provided as an opening and closing section capable of opening and closing the opening section 130*b*.

Next, in the case 131, a front sensor mounting section 140 is provided in the −Y direction, and a rear sensor mounting section 141 is provided in the +Y direction. It is possible to mount the front sensor 93 described with reference to FIG. 15 on the front sensor mounting section 140. It is possible to mount the rear sensor 96 described with reference to FIG. 15 on the rear sensor mounting section 141.

By mounting the front sensor 93 and the rear sensor 96 with respect to the case 131 in this way, it is possible to appropriately determine the relative positions of the front sensor 93 and the rear sensor 96 with respect to the colorimeter 100.

The present disclosure is not limited to the embodiments described above, and various modifications can be made within the scope of the disclosure described in the claims, and it is needless to say that these are also included in the scope of the present disclosure.

What is claimed is:

1. A colorimetry device comprising:
a support base having a support surface for supporting a measurement target and
a carriage to which a colorimeter, which is configured to measure color of the measurement target, is detachably attached and that is configured to move in a first direction, which is a direction along the support surface, and in a second direction, which is a direction along the support surface and which intersects the first direction, wherein
the carriage includes, on an inner wall of an accommodation section that accommodates the colorimeter, a contact surface that is in contact with a side surface of the colorimeter when the colorimeter is being attached or is being detached,
a friction coefficient μ1 between the contact surface and the side surface of the colorimeter is smaller than a friction coefficient μ2 between a housing of the carriage and the side surface of the colorimeter,
in a state where the support surface is along a horizontal plane, the inner wall of the accommodation section is along a vertical direction,
the inner wall further includes
a first wall surface,
a second wall surface opposed to the first wall surface,
a third wall surface that intersects the first wall surface and the second wall surface, and
a fourth wall surface opposed to the third wall surface, and
the contact surface is provided on at least one of the first wall surface, the second wall surface, the third wall surface, and the fourth wall surface.

2. The colorimetry device according to claim 1, wherein the contact surface extends in a vertical direction and is disposed spaced a gap therebetween along a horizontal direction.

3. The colorimetry device according to claim 2, wherein among the side surfaces of the colorimeter, at least a first side surface and a second side surface opposite to the first side surface have an overhang portion that overhangs laterally and
the accommodation section is provided, on the upper portion of the inner wall, with a support section for supporting the colorimeter by catching the overhang portion.

4. The colorimetry device according to claim 3, wherein the contact surface extends to the support section and contacts the overhang portion.

5. The colorimetry device according to claim 3, wherein the carriage is provided on a second direction moving section, which is configured to move in the second direction with respect to the support base by the power of a first motor,
the carriage is further provided to be movable in the first direction with respect to the second direction moving section by the power of a second motor, and
the carriage is further provided to be movable, with respect to the second direction moving section by the power of a third motor, in a third direction, which intersects the first direction and the second direction.

6. The colorimetry device according to claim 5, further comprising:
a control section configured to control the first motor, the second motor, and the third motor, wherein
in a state where the support section supports the colorimeter, the colorimeter protrudes from a bottom surface of the carriage with respect to the support base,
when the colorimeter is to perform colorimetry of the measurement target, the control section performs a lowering control of lowering the carriage to a position at which a bottom surface of the colorimeter is in contact with the measurement target and then of further lowering the carriage in a range in which the bottom surface of the carriage is not in contact with the measurement target, and
when the lowering control is being performed, the contact surface and the side surface of the colorimeter rub against each other.

7. The colorimetry device according to claim 1, wherein an upper end portion of the contact surface extends in a direction away from the side surface of the colorimeter.

8. The colorimetry device according to claim 1, wherein a lower end portion of the contact surface extends in a direction away from the side surface of the colorimeter.

9. The colorimetry device according to claim 1, wherein the contact surface is formed of a sheet material attached to the inner wall of the accommodation section.

10. The colorimetry device according to claim 1, wherein the carriage includes
an outer housing forming an outer shell of the carriage and
a case that is accommodated in the outer housing and that forms the accommodation section, and
the contact surface is formed integrally with the case.

11. A colorimetry device comprising:
a support base having a support surface for supporting a measurement target and
a carriage to which a colorimeter, which is configured to measure color of the measurement target, is detachably attached and that is configured to move in a first direction, which is a direction along the support surface, and in a second direction, which is a direction along the support surface and which intersects the first direction, wherein the carriage includes, on an inner wall of an accommodation section that accommodates the colorimeter, a contact surface that is in contact with a side surface of the colorimeter when the colorimeter is being attached or is being detached, a friction coefficient $\mu 1$ between the contact surface and the side surface of the colorimeter is smaller than a friction coefficient $\mu 2$ between a housing of the carriage and the side surface of the colorimeter, and an upper end portion of the contact surface extends in a direction away from the side surface of the colorimeter.

12. The colorimetry device according to claim 11, wherein in a state where the support surface is along a horizontal plane, the inner wall of the accommodation section is along a vertical direction, the inner wall further includes a first wall surface, a second wall surface opposed to the first wall surface, a third wall surface that intersects the first wall surface and the second wall surface, and a fourth wall surface opposed to the third wall surface, the contact surface is provided on at least one of the first wall surface, the second wall surface, the third wall surface, and the fourth wall surface, and the contact surface extends in a vertical direction and is disposed spaced a gap therebetween along a horizontal direction.

13. The colorimetry device according to claim 12, wherein among the side surfaces of the colorimeter, at least a first side surface and a second side surface opposite to the first side surface have an overhang portion that overhangs laterally and the accommodation section is provided, on the upper portion of the inner wall, with a support section for supporting the colorimeter by catching the overhang portion.

14. The colorimetry device according to claim 13, wherein the contact surface extends to the support section and contacts the overhang portion.

15. The colorimetry device according to claim 12, wherein the carriage is provided on a second direction moving section, which is configured to move in the second direction with respect to the support base by the power of a first motor, the carriage is further provided to be movable in the first direction with respect to the second direction moving section by the power of a second motor, and the carriage is further provided to be movable, with respect to the second direction moving section by the power of a third motor, in a third direction, which intersects the first direction and the second direction.

16. The colorimetry device according to claim 15, further comprising:

a control section configured to control the first motor, the second motor, and the third motor, wherein in a state where the support section supports the colorimeter, the colorimeter protrudes from a bottom surface of the carriage with respect to the support base, when the colorimeter is to perform colorimetry of the measurement target, the control section performs a lowering control of lowering the carriage to a position at which a bottom surface of the colorimeter is in contact with the measurement target and then of further lowering the carriage in a range in which the bottom surface of the carriage is not in contact with the measurement target, and when the lowering control is being performed, the contact surface and the side surface of the colorimeter rub against each other.

17. The colorimetry device according to claim 11, wherein a lower end portion of the contact surface extends in a direction away from the side surface of the colorimeter.

18. The colorimetry device according to claim 11, wherein the contact surface is formed of a sheet material attached to the inner wall of the accommodation section.

19. The colorimetry device according to claim 11, wherein the carriage includes an outer housing forming an outer shell of the carriage and a case that is accommodated in the outer housing and that forms the accommodation section, and the contact surface is formed integrally with the case.

* * * * *